United States Patent
Yeung et al.

(10) Patent No.: US 11,428,165 B2
(45) Date of Patent: Aug. 30, 2022

(54) ONBOARD HEATER OF AUXILIARY SYSTEMS USING EXHAUST GASES AND ASSOCIATED METHODS

(71) Applicant: BJ Energy Solutions, LLC, Houston, TX (US)

(72) Inventors: Tony Yeung, Tomball, TX (US); Ricardo Rodriguez-Ramon, Tomball, TX (US); Joseph Foster, Tomball, TX (US)

(73) Assignee: BJ Energy Solutions, LLC, Houston, TX (US)

( * ) Notice: Subject to any disclaimer, the term of this patent is extended or adjusted under 35 U.S.C. 154(b) by 0 days.

(21) Appl. No.: 15/929,715

(22) Filed: May 18, 2020

(65) Prior Publication Data

US 2021/0355876 A1  Nov. 18, 2021

Related U.S. Application Data

(60) Provisional application No. 62/704,556, filed on May 15, 2020.

(51) Int. Cl.
*F02C 7/08* (2006.01)
*F01D 25/30* (2006.01)
(Continued)

(52) U.S. Cl.
CPC ............. *F02C 7/08* (2013.01); *F01D 25/305* (2013.01); *F01N 5/02* (2013.01); *F02C 6/00* (2013.01);
(Continued)

(58) Field of Classification Search
CPC ...... F02C 7/08; F02C 6/00; F02C 6/18; F01D 25/305; F01N 5/02; F04B 17/00;
(Continued)

(56) References Cited

U.S. PATENT DOCUMENTS

| | | |
|---|---|---|
| 2,498,229 A | 2/1950 | Adler |
| 2,535,703 A | 12/1950 | Smith et al. |

(Continued)

FOREIGN PATENT DOCUMENTS

| | | |
|---|---|---|
| AU | 9609498 | 7/1999 |
| AU | 737970 | 9/2001 |

(Continued)

OTHER PUBLICATIONS

ISM, What is Cracking Pressure, 2019.
(Continued)

*Primary Examiner* — Loren C Edwards
(74) *Attorney, Agent, or Firm* — Womble Bond Dickinson (US) LLP

(57) ABSTRACT

An exhaust energy recovery system (EERS) and associated methods for an engine are disclosed. An embodiment of an EERS, for example, includes an inlet duct that is configured to divert exhaust gas from an exhaust duct of the engine into the recovery system and an outlet duct configured to return the exhaust gas to the exhaust duct downstream of the inlet duct. The recovery system is configured to heat components or fluids associated with engine to operating temperatures. The recovery system may be part of a mobile power system that is mounted to a single trailer and includes an engine and a power unit such as a high pressure pump or generator mounted to the trailer. Methods of operating and purging recovery systems are also disclosed.

7 Claims, 6 Drawing Sheets

(51) Int. Cl.
*F01N 5/02* (2006.01)
*F02C 6/00* (2006.01)
*F04B 17/00* (2006.01)
*F02C 6/18* (2006.01)

(52) U.S. Cl.
CPC .............. *F02C 6/18* (2013.01); *F04B 17/00* (2013.01); *F05D 2220/32* (2013.01); *F05D 2260/20* (2013.01); *F05D 2260/607* (2013.01)

(58) Field of Classification Search
CPC ............ F05D 2220/32; F05D 2260/20; F05D 2260/607; F01K 23/06–108
See application file for complete search history.

(56) References Cited

U.S. PATENT DOCUMENTS

| | | |
|---|---|---|
| 2,868,004 A | 1/1959 | Runde |
| 2,940,377 A | 6/1960 | Darnell et al. |
| 2,947,141 A | 8/1960 | Russ |
| 3,068,796 A | 12/1962 | Pfluger et al. |
| 3,191,517 A | 6/1965 | Solzman |
| 3,257,031 A | 6/1966 | Dietz |
| 3,378,074 A | 4/1968 | Kiel |
| 3,463,612 A * | 8/1969 | Whitsel, Jr. .............. C09C 1/50 423/450 |
| 3,550,696 A | 12/1970 | Kenneday |
| 3,656,582 A | 4/1972 | Alcock |
| 3,739,872 A | 6/1973 | McNair |
| 3,759,063 A | 9/1973 | Bendall |
| 3,765,173 A | 10/1973 | Harris |
| 3,773,438 A | 11/1973 | Hall et al. |
| 3,786,835 A | 1/1974 | Finger |
| 3,791,682 A | 2/1974 | Mitchell |
| 3,796,045 A | 3/1974 | Foster |
| 3,820,922 A | 6/1974 | Buse et al. |
| 4,010,613 A | 3/1977 | McInerney |
| 4,031,407 A | 6/1977 | Reed |
| 4,059,045 A | 11/1977 | McClain |
| 4,086,976 A | 5/1978 | Holm et al. |
| 4,117,342 A | 9/1978 | Melley, Jr. |
| 4,204,808 A | 5/1980 | Reese et al. |
| 4,209,079 A | 6/1980 | Marchal et al. |
| 4,222,229 A | 9/1980 | Uram |
| 4,269,569 A | 5/1981 | Hoover |
| 4,311,395 A | 1/1982 | Douthitt et al. |
| 4,330,237 A | 5/1982 | Battah |
| 4,341,508 A | 7/1982 | Rambin, Jr. |
| 4,357,027 A | 11/1982 | Zeitlow |
| 4,383,478 A | 5/1983 | Jones |
| 4,402,504 A | 9/1983 | Christian |
| 4,457,325 A | 7/1984 | Green |
| 4,470,771 A | 9/1984 | Hall et al. |
| 4,483,684 A | 11/1984 | Black |
| 4,505,650 A | 3/1985 | Hannett et al. |
| 4,574,880 A | 3/1986 | Handke |
| 4,584,654 A | 4/1986 | Crane |
| 4,672,813 A | 6/1987 | David |
| 4,754,607 A | 7/1988 | Mackay |
| 4,782,244 A | 11/1988 | Wakimoto |
| 4,796,777 A | 1/1989 | Keller |
| 4,869,209 A * | 9/1989 | Young ................ F22B 37/56 122/379 |
| 4,913,625 A | 4/1990 | Gerlowski |
| 4,983,259 A | 1/1991 | Duncan |
| 4,990,058 A | 2/1991 | Eslinger |
| 5,135,361 A | 8/1992 | Dion |
| 5,245,970 A | 9/1993 | Iwaszkiewicz et al. |
| 5,291,842 A | 3/1994 | Sallstrom et al. |
| 5,362,219 A | 11/1994 | Paul et al. |
| 5,537,813 A | 7/1996 | Davis et al. |
| 5,553,514 A | 9/1996 | Walkowc |
| 5,560,195 A | 10/1996 | Anderson et al. |
| 5,586,444 A | 12/1996 | Fung |
| 5,622,245 A | 4/1997 | Reik |
| 5,626,103 A * | 5/1997 | Haws .................. F01K 17/025 122/235.14 |
| 5,651,400 A | 7/1997 | Corts et al. |
| 5,678,460 A | 10/1997 | Walkowc |
| 5,717,172 A | 2/1998 | Griffin, Jr. et al. |
| 5,720,598 A | 2/1998 | de Chizzelle |
| 5,839,888 A | 11/1998 | Harrison |
| 5,846,062 A | 12/1998 | Yanagisawa et al. |
| 5,983,962 A | 11/1999 | Gerardot |
| 6,041,856 A | 3/2000 | Thrasher et al. |
| 6,050,080 A | 4/2000 | Horner |
| 6,067,962 A | 5/2000 | Bartley et al. |
| 6,071,188 A | 6/2000 | O'Neill et al. |
| 6,074,170 A | 6/2000 | Bert et al. |
| 6,123,751 A | 9/2000 | Nelson et al. |
| 6,129,335 A | 10/2000 | Yokogi |
| 6,145,318 A | 11/2000 | Kaplan et al. |
| 6,230,481 B1 | 5/2001 | Jahr |
| 6,279,309 B1 | 8/2001 | Lawlor, II et al. |
| 6,321,860 B1 | 11/2001 | Reddoch |
| 6,334,746 B1 | 1/2002 | Nguyen et al. |
| 6,530,224 B1 | 3/2003 | Conchieri |
| 6,543,395 B2 | 4/2003 | Green |
| 6,655,922 B1 | 12/2003 | Flek |
| 6,765,304 B2 | 7/2004 | Baten et al. |
| 6,786,051 B2 | 9/2004 | Kristich et al. |
| 6,851,514 B2 | 2/2005 | Han et al. |
| 6,859,740 B2 | 2/2005 | Stephenson et al. |
| 6,901,735 B2 | 6/2005 | Lohn |
| 7,007,966 B2 | 3/2006 | Campion |
| 7,065,953 B1 | 6/2006 | Kopko |
| 7,143,016 B1 | 11/2006 | Discenzo et al. |
| 7,222,015 B2 | 5/2007 | Davis et al. |
| 7,388,303 B2 | 6/2008 | Seiver |
| 7,545,130 B2 | 6/2009 | Latham |
| 7,552,903 B2 | 6/2009 | Dunn et al. |
| 7,563,076 B2 | 7/2009 | Brunet et al. |
| 7,563,413 B2 | 7/2009 | Naets et al. |
| 7,594,424 B2 | 9/2009 | Fazekas |
| 7,627,416 B2 | 12/2009 | Batenburg et al. |
| 7,677,316 B2 | 3/2010 | Butler et al. |
| 7,721,521 B2 | 5/2010 | Kunkle et al. |
| 7,730,711 B2 | 6/2010 | Kunkle et al. |
| 7,779,961 B2 | 8/2010 | Matte |
| 7,789,452 B2 | 9/2010 | Dempsey et al. |
| 7,845,413 B2 | 12/2010 | Shampine et al. |
| 7,886,702 B2 | 2/2011 | Jerrell et al. |
| 7,900,724 B2 | 3/2011 | Promersberger et al. |
| 7,921,914 B2 | 4/2011 | Bruins et al. |
| 7,938,151 B2 | 5/2011 | Hockner |
| 7,980,357 B2 | 7/2011 | Edwards |
| 8,083,504 B2 | 12/2011 | Williams et al. |
| 8,186,334 B2 | 5/2012 | Ooyama |
| 8,196,555 B2 | 6/2012 | Ikeda et al. |
| 8,202,354 B2 | 6/2012 | Iijima |
| 8,316,936 B2 | 11/2012 | Roddy et al. |
| 8,414,673 B2 | 4/2013 | Raje et al. |
| 8,506,267 B2 | 8/2013 | Gambier et al. |
| 8,575,873 B2 | 11/2013 | Peterson et al. |
| 8,616,005 B1 | 12/2013 | Cousino, Sr. et al. |
| 8,621,873 B2 | 1/2014 | Robertson et al. |
| 8,672,606 B2 | 3/2014 | Glynn et al. |
| 8,707,853 B1 | 4/2014 | Dille et al. |
| 8,714,253 B2 | 5/2014 | Sherwood et al. |
| 8,757,918 B2 | 6/2014 | Ramnarain et al. |
| 8,770,329 B2 | 7/2014 | Spitler |
| 8,784,081 B2 | 7/2014 | Blume |
| 8,789,601 B2 | 7/2014 | Broussard et al. |
| 8,794,307 B2 | 8/2014 | Coquilleau et al. |
| 8,851,441 B2 | 10/2014 | Acuna et al. |
| 8,905,056 B2 | 12/2014 | Kendrick |
| 8,951,019 B2 | 2/2015 | Hains et al. |
| 8,973,560 B2 | 3/2015 | Krug |
| 8,997,904 B2 | 4/2015 | Cryer et al. |
| 9,032,620 B2 | 5/2015 | Frassinelli et al. |
| 9,057,247 B2 | 6/2015 | Kumar et al. |
| 9,103,193 B2 | 8/2015 | Coli et al. |
| 9,121,257 B2 | 9/2015 | Coli et al. |
| 9,140,110 B2 | 9/2015 | Coli et al. |

(56) References Cited

U.S. PATENT DOCUMENTS

| | | |
|---|---|---|
| 9,187,982 B2 | 11/2015 | Dehring et al. |
| 9,206,667 B2 | 12/2015 | Khvoshchev et al. |
| 9,212,643 B2 | 12/2015 | Deliyski |
| 9,222,346 B1 | 12/2015 | Walls |
| 9,341,055 B2 | 5/2016 | Weightman et al. |
| 9,346,662 B2 | 5/2016 | Van Vliet et al. |
| 9,366,114 B2 | 6/2016 | Coli et al. |
| 9,376,786 B2 | 6/2016 | Numasawa |
| 9,394,829 B2 | 7/2016 | Cabeen et al. |
| 9,395,049 B2 | 7/2016 | Vicknair et al. |
| 9,401,670 B2 | 7/2016 | Minato et al. |
| 9,410,410 B2 | 8/2016 | Broussard et al. |
| 9,410,546 B2 | 8/2016 | Jaeger et al. |
| 9,429,078 B1 | 8/2016 | Crowe et al. |
| 9,488,169 B2 | 11/2016 | Cochran et al. |
| 9,493,997 B2 | 11/2016 | Liu et al. |
| 9,512,783 B2 | 12/2016 | Veilleux et al. |
| 9,534,473 B2 | 1/2017 | Morris et al. |
| 9,546,652 B2 | 1/2017 | Yin |
| 9,550,501 B2 | 1/2017 | Ledbetter |
| 9,556,721 B2 | 1/2017 | Jang et al. |
| 9,562,420 B2 | 2/2017 | Morris et al. |
| 9,570,945 B2 | 2/2017 | Fischer |
| 9,579,980 B2 | 2/2017 | Cryer et al. |
| 9,587,649 B2 | 3/2017 | Oehring |
| 9,611,728 B2 | 4/2017 | Oehring |
| 9,617,808 B2 | 4/2017 | Liu et al. |
| 9,638,101 B1 | 5/2017 | Crowe et al. |
| 9,638,194 B2 | 5/2017 | Wiegman et al. |
| 9,650,871 B2 | 5/2017 | Oehring et al. |
| 9,656,762 B2 | 5/2017 | Kamath et al. |
| 9,689,316 B1 | 6/2017 | Crom |
| 9,739,130 B2 | 8/2017 | Young |
| 9,764,266 B1 | 9/2017 | Carter |
| 9,777,748 B2 | 10/2017 | Lu et al. |
| 9,803,467 B2 | 10/2017 | Tang et al. |
| 9,803,793 B2 | 10/2017 | Davi et al. |
| 9,809,308 B2 | 11/2017 | Aguilar et al. |
| 9,829,002 B2 | 11/2017 | Crom |
| 9,840,897 B2 | 12/2017 | Larson |
| 9,840,901 B2 | 12/2017 | Oering et al. |
| 9,850,422 B2 | 12/2017 | Lestz et al. |
| 9,856,131 B1 | 1/2018 | Moffitt |
| 9,863,279 B2 | 1/2018 | Laing et al. |
| 9,869,305 B1 | 1/2018 | Crowe et al. |
| 9,879,609 B1 | 1/2018 | Crowe et al. |
| 9,893,500 B2 | 2/2018 | Oehring et al. |
| 9,893,660 B2 | 2/2018 | Peterson et al. |
| 9,920,615 B2 | 3/2018 | Zhang et al. |
| 9,945,365 B2 | 4/2018 | Hernandez et al. |
| 9,964,052 B2 | 5/2018 | Millican et al. |
| 9,970,278 B2 | 5/2018 | Broussard et al. |
| 9,981,840 B2 | 5/2018 | Shock |
| 9,995,102 B2 | 6/2018 | Dillie et al. |
| 9,995,218 B2 | 6/2018 | Oehring et al. |
| 10,008,880 B2 | 6/2018 | Vicknair et al. |
| 10,008,912 B2 | 6/2018 | Davey et al. |
| 10,018,096 B2 | 7/2018 | Wallimann et al. |
| 10,020,711 B2 | 7/2018 | Oehring et al. |
| 10,024,123 B2 | 7/2018 | Steffenhagen et al. |
| 10,029,289 B2 | 7/2018 | Wendorski et al. |
| 10,030,579 B2 | 7/2018 | Austin et al. |
| 10,036,238 B2 | 7/2018 | Gehring |
| 10,040,541 B2 | 8/2018 | Wilson et al. |
| 10,060,293 B2 | 8/2018 | Del Bono |
| 10,060,349 B2 | 8/2018 | Álvarez et al. |
| 10,077,933 B2 | 9/2018 | Nelson et al. |
| 10,082,137 B2 | 9/2018 | Graham et al. |
| 10,094,366 B2 | 10/2018 | Marica |
| 10,100,827 B2 | 10/2018 | Devan et al. |
| 10,107,084 B2 | 10/2018 | Coli et al. |
| 10,107,085 B2 | 10/2018 | Coli et al. |
| 10,114,061 B2 | 10/2018 | Frampton et al. |
| 10,119,381 B2 | 11/2018 | Oehring et al. |
| 10,134,257 B2 | 11/2018 | Zhang et al. |
| 10,138,098 B2 | 11/2018 | Sorensen et al. |
| 10,151,244 B2 | 12/2018 | Giancotti et al. |
| 10,174,599 B2 | 1/2019 | Shampine et al. |
| 10,184,397 B2 | 1/2019 | Austin et al. |
| 10,196,258 B2 | 2/2019 | Kalala et al. |
| 10,221,856 B2 | 3/2019 | Hernandez et al. |
| 10,227,854 B2 | 3/2019 | Glass |
| 10,227,855 B2 | 3/2019 | Coli et al. |
| 10,246,984 B2 | 4/2019 | Payne et al. |
| 10,247,182 B2 | 4/2019 | Zhang et al. |
| 10,254,732 B2 | 4/2019 | Oehring et al. |
| 10,267,439 B2 | 4/2019 | Pryce et al. |
| 10,280,724 B2 | 5/2019 | Hinderliter |
| 10,287,943 B1 | 5/2019 | Schiltz |
| 10,288,519 B2 | 5/2019 | De La Cruz |
| 10,303,190 B2 | 5/2019 | Shock |
| 10,316,832 B2 | 6/2019 | Byrne |
| 10,317,875 B2 | 6/2019 | Pandurangan |
| 10,337,402 B2 | 7/2019 | Austin et al. |
| 10,358,035 B2 | 7/2019 | Cryer |
| 10,371,012 B2 | 8/2019 | Davis et al. |
| 10,374,485 B2 | 8/2019 | Morris et al. |
| 10,378,326 B2 | 8/2019 | Morris et al. |
| 10,393,108 B2 | 8/2019 | Chong et al. |
| 10,407,990 B2 | 9/2019 | Oehring et al. |
| 10,408,031 B2 | 9/2019 | Oehring et al. |
| 10,415,348 B2 | 9/2019 | Zhang et al. |
| 10,415,557 B1 | 9/2019 | Crowe et al. |
| 10,415,562 B2 | 9/2019 | Kajita et al. |
| RE47,695 E | 11/2019 | Case et al. |
| 10,465,689 B2 | 11/2019 | Crom |
| 10,478,753 B1 | 11/2019 | Elms et al. |
| 10,526,882 B2 | 1/2020 | Oehring et al. |
| 10,563,649 B2 | 2/2020 | Zhang et al. |
| 10,577,910 B2 | 3/2020 | Stephenson |
| 10,584,645 B2 | 3/2020 | Nakagawa et al. |
| 10,598,258 B2 | 3/2020 | Oehring et al. |
| 10,610,842 B2 | 4/2020 | Chong |
| 10,711,787 B1 | 7/2020 | Darley |
| 10,738,580 B1 | 8/2020 | Fischer et al. |
| 10,753,153 B1 | 8/2020 | Fischer et al. |
| 10,753,165 B1 | 8/2020 | Fischer et al. |
| 10,794,165 B2 | 10/2020 | Fischer et al. |
| 10,794,166 B2 | 10/2020 | Reckels et al. |
| 10,801,311 B1 | 10/2020 | Cui et al. |
| 10,815,764 B1 | 10/2020 | Yeung et al. |
| 10,815,978 B2 | 10/2020 | Glass |
| 10,830,032 B1 | 11/2020 | Zhang et al. |
| 10,859,203 B1 | 12/2020 | Cui et al. |
| 10,864,487 B1 | 12/2020 | Han et al. |
| 10,865,624 B1 | 12/2020 | Cui et al. |
| 10,865,631 B1 | 12/2020 | Zhang et al. |
| 10,870,093 B1 | 12/2020 | Zhong et al. |
| 10,895,202 B1 | 1/2021 | Yeung et al. |
| 10,907,459 B1 | 2/2021 | Yeung et al. |
| 10,927,774 B2 | 2/2021 | Cai et al. |
| 10,954,770 B1 | 3/2021 | Yeung et al. |
| 10,954,855 B1 | 3/2021 | Ji et al. |
| 10,961,908 B1 | 3/2021 | Yeung et al. |
| 10,961,912 B1 | 3/2021 | Yeung et al. |
| 10,961,914 B1 | 3/2021 | Yeung et al. |
| 10,961,993 B1 | 3/2021 | Ji et al. |
| 10,982,523 B1 | 4/2021 | Hill et al. |
| 10,989,019 B2 | 4/2021 | Cai et al. |
| 10,995,564 B2 | 5/2021 | Miller et al. |
| 11,002,189 B2 | 5/2021 | Yeung et al. |
| 11,015,423 B1 | 5/2021 | Yeung et al. |
| 11,035,214 B2 | 6/2021 | Cui et al. |
| 11,047,379 B1 | 6/2021 | Li et al. |
| 11,053,853 B2 | 7/2021 | Li et al. |
| 11,060,455 B1 | 7/2021 | Yeung et al. |
| 11,085,281 B1 | 8/2021 | Yeung et al. |
| 11,105,250 B1 | 8/2021 | Zhang et al. |
| 11,105,266 B2 | 8/2021 | Zhou et al. |
| 11,125,156 B2 | 9/2021 | Zhang et al. |
| 11,143,000 B2 | 10/2021 | Li et al. |
| 11,143,006 B1 | 10/2021 | Zhang et al. |
| 11,236,739 B2 | 2/2022 | Yeung et al. |
| 11,242,737 B2 | 2/2022 | Zhang et al. |

(56) References Cited

U.S. PATENT DOCUMENTS

| | | |
|---|---|---|
| 11,243,509 B2 | 2/2022 | Cai et al. |
| 11,251,650 B1 | 2/2022 | Liu et al. |
| 2004/0016245 A1 | 1/2004 | Pierson |
| 2004/0074238 A1* | 4/2004 | Wantanabe ............ F24D 11/005 60/784 |
| 2004/0076526 A1 | 4/2004 | Fukano et al. |
| 2004/0187950 A1 | 9/2004 | Cohen et al. |
| 2004/0219040 A1 | 11/2004 | Kugelev et al. |
| 2005/0051322 A1* | 3/2005 | Speer ..................... F01N 5/02 165/284 |
| 2005/0139286 A1 | 6/2005 | Poulter |
| 2005/0196298 A1 | 9/2005 | Manning |
| 2005/0226754 A1 | 10/2005 | Orr et al. |
| 2005/0274134 A1 | 12/2005 | Ryu et al. |
| 2006/0061091 A1 | 3/2006 | Osterloh |
| 2006/0062914 A1 | 3/2006 | Garg et al. |
| 2006/0196251 A1 | 9/2006 | Richey |
| 2006/0211356 A1 | 9/2006 | Grassman |
| 2006/0260331 A1 | 11/2006 | Andreychuk |
| 2007/0029090 A1 | 2/2007 | Andreychuk et al. |
| 2007/0066406 A1 | 3/2007 | Keller et al. |
| 2007/0107981 A1 | 5/2007 | Sicotte |
| 2007/0125544 A1 | 6/2007 | Robinson et al. |
| 2007/0181212 A1 | 8/2007 | Fell |
| 2007/0277982 A1 | 12/2007 | Shampine et al. |
| 2007/0295569 A1 | 12/2007 | Manzoor et al. |
| 2008/0006089 A1 | 1/2008 | Adnan et al. |
| 2008/0098891 A1 | 5/2008 | Feher |
| 2008/0161974 A1 | 7/2008 | Alston |
| 2008/0264625 A1 | 10/2008 | Ochoa |
| 2008/0264649 A1 | 10/2008 | Crawford |
| 2009/0064685 A1 | 3/2009 | Busekros et al. |
| 2009/0068031 A1 | 3/2009 | Gambier et al. |
| 2009/0092510 A1 | 4/2009 | Williams et al. |
| 2009/0124191 A1 | 5/2009 | Van Becelaere et al. |
| 2010/0019626 A1 | 1/2010 | Stout et al. |
| 2010/0071899 A1 | 3/2010 | Coquilleau et al. |
| 2010/0218508 A1 | 9/2010 | Brown et al. |
| 2010/0300683 A1 | 12/2010 | Looper et al. |
| 2010/0310384 A1 | 12/2010 | Stephenson et al. |
| 2011/0052423 A1 | 3/2011 | Gambier et al. |
| 2011/0054704 A1 | 3/2011 | Karpman et al. |
| 2011/0085924 A1 | 4/2011 | Shampine et al. |
| 2011/0146244 A1 | 6/2011 | Farman et al. |
| 2011/0146246 A1 | 6/2011 | Farman et al. |
| 2011/0197988 A1 | 8/2011 | Van Vliet et al. |
| 2011/0241888 A1 | 10/2011 | Lu et al. |
| 2011/0265443 A1 | 11/2011 | Ansari |
| 2011/0272158 A1 | 11/2011 | Neal |
| 2012/0048242 A1 | 3/2012 | Sumilla et al. |
| 2012/0137699 A1 | 6/2012 | Montagne et al. |
| 2012/0179444 A1 | 7/2012 | Ganguly et al. |
| 2012/0192542 A1 | 8/2012 | Chillar et al. |
| 2012/0199001 A1 | 8/2012 | Chillar et al. |
| 2012/0204627 A1 | 8/2012 | Anderl et al. |
| 2012/0255734 A1 | 10/2012 | Coli et al. |
| 2012/0310509 A1 | 12/2012 | Pardo et al. |
| 2013/0068307 A1 | 3/2013 | Hains et al. |
| 2013/0087045 A1 | 4/2013 | Sullivan et al. |
| 2013/0087945 A1 | 4/2013 | Kusters et al. |
| 2013/0189915 A1 | 7/2013 | Hazard |
| 2013/0255953 A1 | 10/2013 | Tudor |
| 2013/0259707 A1 | 10/2013 | Yin |
| 2013/0284455 A1 | 10/2013 | Kajaria et al. |
| 2013/0300341 A1 | 11/2013 | Gillette |
| 2013/0306322 A1 | 11/2013 | Sanborn |
| 2014/0010671 A1 | 1/2014 | Cryer et al. |
| 2014/0013768 A1 | 1/2014 | Laing et al. |
| 2014/0032082 A1 | 1/2014 | Gehrke et al. |
| 2014/0044517 A1 | 2/2014 | Saha et al. |
| 2014/0048253 A1 | 2/2014 | Andreychuk |
| 2014/0090729 A1 | 4/2014 | Coulter et al. |
| 2014/0090742 A1 | 4/2014 | Coskrey et al. |
| 2014/0094105 A1 | 4/2014 | Lundh et al. |
| 2014/0123621 A1 | 5/2014 | Driessens et al. |
| 2014/0130422 A1 | 5/2014 | Laing et al. |
| 2014/0138079 A1 | 5/2014 | Broussard et al. |
| 2014/0144641 A1 | 5/2014 | Chandler |
| 2014/0147291 A1 | 5/2014 | Burnette |
| 2014/0158345 A1 | 6/2014 | Jang et al. |
| 2014/0196459 A1 | 7/2014 | Futa et al. |
| 2014/0216736 A1 | 8/2014 | Leugemors et al. |
| 2014/0219824 A1 | 8/2014 | Burnette |
| 2014/0251623 A1 | 9/2014 | Lestz et al. |
| 2014/0277772 A1 | 9/2014 | Lopez et al. |
| 2014/0290266 A1 | 10/2014 | Veilleux, Jr. et al. |
| 2014/0318638 A1 | 10/2014 | Harwood et al. |
| 2015/0078924 A1 | 3/2015 | Zhang et al. |
| 2015/0101344 A1 | 4/2015 | Jarrier et al. |
| 2015/0114652 A1 | 4/2015 | Lestz et al. |
| 2015/0129210 A1 | 5/2015 | Chong et al. |
| 2015/0135659 A1 | 5/2015 | Jarrier et al. |
| 2015/0159553 A1 | 6/2015 | Kippel et al. |
| 2015/0192117 A1 | 7/2015 | Bridges |
| 2015/0204148 A1 | 7/2015 | Liu et al. |
| 2015/0204322 A1 | 7/2015 | lund et al. |
| 2015/0211512 A1 | 7/2015 | Wiegman et al. |
| 2015/0217672 A1 | 8/2015 | Shampine et al. |
| 2015/0226140 A1 | 8/2015 | Zhang et al. |
| 2015/0252661 A1 | 9/2015 | Glass |
| 2015/0275891 A1 | 10/2015 | Chong et al. |
| 2015/0340864 A1 | 11/2015 | Compton |
| 2015/0345385 A1 | 12/2015 | Santini |
| 2015/0369351 A1 | 12/2015 | Hermann et al. |
| 2016/0032703 A1 | 2/2016 | Broussard et al. |
| 2016/0102581 A1 | 4/2016 | Del Bono |
| 2016/0105022 A1 | 4/2016 | Oehring et al. |
| 2016/0108713 A1 | 4/2016 | Dunaeva et al. |
| 2016/0177675 A1 | 6/2016 | Morris et al. |
| 2016/0177945 A1 | 6/2016 | Byrne et al. |
| 2016/0186671 A1 | 6/2016 | Austin et al. |
| 2016/0195082 A1 | 7/2016 | Wiegman et al. |
| 2016/0215774 A1 | 7/2016 | Oklejas et al. |
| 2016/0230525 A1 | 8/2016 | Lestz et al. |
| 2016/0244314 A1 | 8/2016 | Van Vliet et al. |
| 2016/0248230 A1 | 8/2016 | Tawy et al. |
| 2016/0253634 A1 | 9/2016 | Thomeer et al. |
| 2016/0258267 A1 | 9/2016 | Payne et al. |
| 2016/0273346 A1 | 9/2016 | Tang et al. |
| 2016/0290114 A1 | 10/2016 | Oehring et al. |
| 2016/0319650 A1 | 11/2016 | Oehring et al. |
| 2016/0326845 A1 | 11/2016 | Djikpesse et al. |
| 2016/0348479 A1 | 12/2016 | Oehring et al. |
| 2016/0369609 A1 | 12/2016 | Morris et al. |
| 2017/0009905 A1 | 1/2017 | Arnold |
| 2017/0016433 A1 | 1/2017 | Chong et al. |
| 2017/0030177 A1 | 2/2017 | Oehring et al. |
| 2017/0038137 A1 | 2/2017 | Turney |
| 2017/0074076 A1 | 3/2017 | Joseph et al. |
| 2017/0074089 A1 | 3/2017 | Agarwal et al. |
| 2017/0082110 A1 | 3/2017 | Lammers |
| 2017/0089189 A1 | 3/2017 | Norris et al. |
| 2017/0114613 A1 | 4/2017 | Lecerf et al. |
| 2017/0114625 A1 | 4/2017 | Norris et al. |
| 2017/0122310 A1 | 5/2017 | Ladron de Guevara |
| 2017/0145918 A1 | 5/2017 | Oehring et al. |
| 2017/0191350 A1 | 7/2017 | Johns et al. |
| 2017/0218727 A1 | 8/2017 | Oehring et al. |
| 2017/0226839 A1 | 8/2017 | Broussard et al. |
| 2017/0226998 A1 | 8/2017 | Zhang et al. |
| 2017/0227002 A1 | 8/2017 | Mikulski et al. |
| 2017/0233103 A1 | 8/2017 | Teicholz et al. |
| 2017/0234165 A1 | 8/2017 | Kersey et al. |
| 2017/0234308 A1 | 8/2017 | Buckley |
| 2017/0248034 A1 | 8/2017 | Dzieciol et al. |
| 2017/0275149 A1 | 9/2017 | Schmidt |
| 2017/0288400 A1 | 10/2017 | Williams |
| 2017/0292409 A1 | 10/2017 | Aguilar et al. |
| 2017/0302135 A1 | 10/2017 | Cory |
| 2017/0305736 A1 | 10/2017 | Haile et al. |
| 2017/0306847 A1 | 10/2017 | Suciu et al. |
| 2017/0322086 A1 | 11/2017 | Luharuka |
| 2017/0333086 A1 | 11/2017 | Jackson |
| 2017/0334448 A1 | 11/2017 | Schwunk |

(56) References Cited

U.S. PATENT DOCUMENTS

| | | |
|---|---|---|
| 2017/0335842 A1 | 11/2017 | Robinson et al. |
| 2017/0350471 A1 | 12/2017 | Steidl et al. |
| 2017/0370199 A1 | 12/2017 | Witkowski et al. |
| 2017/0370480 A1 | 12/2017 | Witkowski et al. |
| 2018/0034280 A1 | 2/2018 | Pedersen |
| 2018/0038328 A1 | 2/2018 | Louven et al. |
| 2018/0041093 A1 | 2/2018 | Miranda |
| 2018/0045202 A1 | 2/2018 | Crom |
| 2018/0038216 A1 | 3/2018 | Zhang et al. |
| 2018/0058171 A1 | 3/2018 | Roesner et al. |
| 2018/0156210 A1 | 6/2018 | Oehring et al. |
| 2018/0172294 A1 | 6/2018 | Owen |
| 2018/0183219 A1 | 6/2018 | Oehring et al. |
| 2018/0186442 A1 | 7/2018 | Maier |
| 2018/0187662 A1 | 7/2018 | Hill et al. |
| 2018/0209415 A1 | 7/2018 | Zhang et al. |
| 2018/0223640 A1 | 8/2018 | Keihany et al. |
| 2018/0224044 A1 | 8/2018 | Penney |
| 2018/0229998 A1 | 8/2018 | Shock |
| 2018/0258746 A1 | 9/2018 | Broussard et al. |
| 2018/0266412 A1 | 9/2018 | Stokkevag et al. |
| 2018/0278124 A1 | 9/2018 | Oehring et al. |
| 2018/0283102 A1 | 10/2018 | Cook |
| 2018/0283618 A1 | 10/2018 | Cook |
| 2018/0284817 A1 | 10/2018 | Cook et al. |
| 2018/0290877 A1 | 10/2018 | Shock |
| 2018/0291781 A1 | 10/2018 | Pedrini |
| 2018/0298731 A1 | 10/2018 | Bishop |
| 2018/0298735 A1 | 10/2018 | Conrad |
| 2018/0307255 A1 | 10/2018 | Bishop |
| 2018/0328157 A1 | 11/2018 | Bishop |
| 2018/0334893 A1 | 11/2018 | Oehring |
| 2018/0363435 A1 | 12/2018 | Coli et al. |
| 2018/0363436 A1 | 12/2018 | Coli et al. |
| 2018/0363437 A1 | 12/2018 | Coli et al. |
| 2018/0363438 A1 | 12/2018 | Coli et al. |
| 2019/0003272 A1 | 1/2019 | Morris et al. |
| 2019/0003329 A1 | 1/2019 | Morris et al. |
| 2019/0010793 A1 | 1/2019 | Hinderliter |
| 2019/0011051 A1 | 1/2019 | Yeung |
| 2019/0048993 A1 | 2/2019 | Akiyama et al. |
| 2019/0063263 A1 | 2/2019 | Davis et al. |
| 2019/0063341 A1 | 2/2019 | Davis |
| 2019/0067991 A1 | 2/2019 | Davis et al. |
| 2019/0071992 A1 | 3/2019 | Feng |
| 2019/0072005 A1 | 3/2019 | Fisher et al. |
| 2019/0078471 A1 | 3/2019 | Braglia et al. |
| 2019/0091619 A1 | 3/2019 | Huang |
| 2019/0106316 A1 | 4/2019 | Van Vliet et al. |
| 2019/0106970 A1 | 4/2019 | Oehring |
| 2019/0112908 A1 | 4/2019 | Coli et al. |
| 2019/0112910 A1 | 4/2019 | Oehring et al. |
| 2019/0119096 A1 | 4/2019 | Haile et al. |
| 2019/0120024 A1 | 4/2019 | Oehring et al. |
| 2019/0120031 A1 | 4/2019 | Gilje |
| 2019/0120134 A1 | 4/2019 | Goleczka et al. |
| 2019/0128247 A1 | 5/2019 | Douglas, III |
| 2019/0128288 A1 | 5/2019 | Konada et al. |
| 2019/0131607 A1 | 5/2019 | Gillette |
| 2019/0136677 A1 | 5/2019 | Shampine et al. |
| 2019/0153843 A1 | 5/2019 | Headrick et al. |
| 2019/0154020 A1 | 5/2019 | Glass |
| 2019/0264667 A1 | 5/2019 | Byrne |
| 2019/0178234 A1 | 6/2019 | Beisel |
| 2019/0178235 A1 | 6/2019 | Coskrey et al. |
| 2019/0185312 A1 | 6/2019 | Bush et al. |
| 2019/0203572 A1 | 7/2019 | Morris et al. |
| 2019/0204021 A1* | 7/2019 | Morris ............... F28F 27/00 |
| 2019/0211661 A1 | 7/2019 | Reckles et al. |
| 2019/0217258 A1 | 7/2019 | Bishop |
| 2019/0226317 A1 | 7/2019 | Payne et al. |
| 2019/0245348 A1 | 8/2019 | Hinderliter et al. |
| 2019/0249652 A1 | 8/2019 | Stephenson et al. |
| 2019/0249754 A1 | 8/2019 | Oehring et al. |
| 2019/0257297 A1 | 8/2019 | Botting et al. |
| 2019/0277279 A1 | 9/2019 | Byrne et al. |
| 2019/0277295 A1 | 9/2019 | Clyburn et al. |
| 2019/0309585 A1 | 10/2019 | Miller et al. |
| 2019/0316447 A1 | 10/2019 | Oehring et al. |
| 2019/0316456 A1 | 10/2019 | Beisel et al. |
| 2019/0323337 A1 | 10/2019 | Glass et al. |
| 2019/0330923 A1 | 10/2019 | Gable et al. |
| 2019/0331117 A1 | 10/2019 | Gable et al. |
| 2019/0338762 A1 | 11/2019 | Curry et al. |
| 2019/0345920 A1 | 11/2019 | Surjaatmadja et al. |
| 2019/0353103 A1 | 11/2019 | Roberge |
| 2019/0356199 A1 | 11/2019 | Morris et al. |
| 2019/0376449 A1 | 12/2019 | Carrell |
| 2020/0003205 A1 | 1/2020 | Stokkevag et al. |
| 2020/0011165 A1 | 1/2020 | George et al. |
| 2020/0040878 A1 | 2/2020 | Morris |
| 2020/0049136 A1 | 2/2020 | Stephenson |
| 2020/0049153 A1 | 2/2020 | Headrick et al. |
| 2020/0071998 A1 | 3/2020 | Gehring et al. |
| 2020/0072201 A1 | 3/2020 | Marica |
| 2020/0088202 A1 | 3/2020 | Sigmar et al. |
| 2020/0095854 A1 | 3/2020 | Hinderliter |
| 2020/0132058 A1 | 4/2020 | Mollatt |
| 2020/0141219 A1 | 5/2020 | Oehring et al. |
| 2020/0141907 A1 | 5/2020 | Meek et al. |
| 2020/0166026 A1 | 5/2020 | Marica |
| 2020/0206704 A1 | 7/2020 | Chong |
| 2020/0208733 A1 | 7/2020 | Kim |
| 2020/0223648 A1 | 7/2020 | Herman et al. |
| 2020/0224645 A1 | 7/2020 | Buckley |
| 2020/0256333 A1 | 8/2020 | Surjaatmadja |
| 2020/0263498 A1 | 8/2020 | Fischer et al. |
| 2020/0263525 A1 | 8/2020 | Reid |
| 2020/0263526 A1 | 8/2020 | Fischer et al. |
| 2020/0263527 A1 | 8/2020 | Fischer et al. |
| 2020/0263528 A1 | 8/2020 | Fischer et al. |
| 2020/0267888 A1 | 8/2020 | Putz |
| 2020/0291731 A1 | 9/2020 | Haiderer et al. |
| 2020/0309113 A1 | 10/2020 | Hunter et al. |
| 2020/0325752 A1 | 10/2020 | Clark et al. |
| 2020/0325760 A1 | 10/2020 | Markham |
| 2020/0325761 A1 | 10/2020 | Williams |
| 2020/0325893 A1 | 10/2020 | Kraige et al. |
| 2020/0332784 A1 | 10/2020 | Zhang et al. |
| 2020/0332788 A1 | 10/2020 | Cui et al. |
| 2020/0340313 A1 | 10/2020 | Fischer et al. |
| 2020/0340340 A1 | 10/2020 | Oehring et al. |
| 2020/0340344 A1 | 10/2020 | Reckels et al. |
| 2020/0340404 A1 | 10/2020 | Stockstill |
| 2020/0347725 A1 | 11/2020 | Morris et al. |
| 2020/0354928 A1 | 11/2020 | Wehler et al. |
| 2020/0362760 A1 | 11/2020 | Morenko et al. |
| 2020/0362764 A1 | 11/2020 | Saintignan et al. |
| 2020/0370394 A1 | 11/2020 | Cai et al. |
| 2020/0370408 A1 | 11/2020 | Cai et al. |
| 2020/0370429 A1 | 11/2020 | Cai et al. |
| 2020/0371490 A1 | 11/2020 | Cai et al. |
| 2020/0340322 A1 | 12/2020 | Sizemore et al. |
| 2020/0392826 A1 | 12/2020 | Cui et al. |
| 2020/0392827 A1 | 12/2020 | George et al. |
| 2020/0393088 A1 | 12/2020 | Sizemore et al. |
| 2020/0398238 A1 | 12/2020 | Zhong et al. |
| 2020/0400000 A1 | 12/2020 | Ghasripoor et al. |
| 2020/0400005 A1 | 12/2020 | Han et al. |
| 2020/0407625 A1 | 12/2020 | Stephenson |
| 2020/0408071 A1 | 12/2020 | Li et al. |
| 2020/0408144 A1 | 12/2020 | Feng et al. |
| 2020/0408147 A1 | 12/2020 | Zhang et al. |
| 2020/0408149 A1 | 12/2020 | Li et al. |
| 2021/0025324 A1 | 1/2021 | Morris et al. |
| 2021/0025383 A1 | 1/2021 | Bodishbaugh et al. |
| 2021/0054727 A1 | 2/2021 | Floyd |
| 2021/0071574 A1 | 3/2021 | Feng et al. |
| 2021/0071579 A1 | 3/2021 | Li et al. |
| 2021/0071654 A1 | 3/2021 | Brunson |
| 2021/0071752 A1 | 3/2021 | Cui et al. |
| 2021/0079758 A1 | 3/2021 | Yeung et al. |
| 2021/0079851 A1 | 3/2021 | Yeung et al. |
| 2021/0086851 A1 | 3/2021 | Zhang et al. |

(56) References Cited

U.S. PATENT DOCUMENTS

| | | |
|---|---|---|
| 2021/0087883 A1 | 3/2021 | Zhang et al. |
| 2021/0087916 A1 | 3/2021 | Zhang et al. |
| 2021/0087925 A1 | 3/2021 | Heidari et al. |
| 2021/0087943 A1 | 3/2021 | Cui et al. |
| 2021/0088042 A1 | 3/2021 | Zhang et al. |
| 2021/0123425 A1 | 4/2021 | Cui et al. |
| 2021/0123434 A1 | 4/2021 | Cui et al. |
| 2021/0123435 A1 | 4/2021 | Cui et al. |
| 2021/0131409 A1 | 5/2021 | Cui et al. |
| 2021/0156240 A1 | 5/2021 | Cicci et al. |
| 2021/0156241 A1 | 5/2021 | Cook |
| 2021/0172282 A1 | 6/2021 | Wang et al. |
| 2021/0180517 A1 | 6/2021 | Zhou et al. |
| 2021/0199110 A1 | 7/2021 | Albert et al. |
| 2021/0222690 A1 | 7/2021 | Beisel |
| 2021/0246774 A1 | 8/2021 | Cui et al. |
| 2021/0285311 A1 | 9/2021 | Ji et al. |
| 2021/0285432 A1 | 9/2021 | Ji et al. |
| 2021/0301807 A1 | 9/2021 | Cui et al. |
| 2021/0306720 A1 | 9/2021 | Sandoval et al. |
| 2021/0308638 A1 | 10/2021 | Zhong et al. |
| 2021/0348475 A1 | 11/2021 | Yeung et al. |
| 2021/0348476 A1 | 11/2021 | Yeung et al. |
| 2021/0348477 A1 | 11/2021 | Yeung et al. |
| 2021/0355927 A1 | 11/2021 | Jian et al. |
| 2021/0372395 A1 | 12/2021 | Li et al. |
| 2021/0388760 A1 | 12/2021 | Feng et al. |
| 2022/0082007 A1 | 3/2022 | Zhang et al. |
| 2022/0090476 A1 | 3/2022 | Zhang et al. |
| 2022/0090477 A1 | 3/2022 | Zhang et al. |
| 2022/0090478 A1 | 3/2022 | Zhang et al. |

FOREIGN PATENT DOCUMENTS

| | | |
|---|---|---|
| CA | 2043184 | 8/1994 |
| CA | 2829762 | 9/2012 |
| CA | 2876687 A1 | 5/2014 |
| CA | 2693567 | 9/2014 |
| CA | 2876687 C | 4/2019 |
| CA | 2919175 | 3/2021 |
| CN | 2622404 | 6/2004 |
| CN | 2779054 | 5/2006 |
| CN | 2890325 | 4/2007 |
| CN | 200964929 Y | 10/2007 |
| CN | 101323151 A | 12/2008 |
| CN | 201190660 Y | 2/2009 |
| CN | 201190892 Y | 2/2009 |
| CN | 201190893 Y | 2/2009 |
| CN | 101414171 A | 4/2009 |
| CN | 201215073 Y | 4/2009 |
| CN | 201236650 Y | 5/2009 |
| CN | 201275542 Y | 7/2009 |
| CN | 201275801 Y | 7/2009 |
| CN | 201333385 Y | 10/2009 |
| CN | 201443300 U | 4/2010 |
| CN | 201496415 U | 6/2010 |
| CN | 201501365 U | 6/2010 |
| CN | 201507271 U | 6/2010 |
| CN | 101323151 B | 7/2010 |
| CN | 201560210 U | 8/2010 |
| CN | 201581862 U | 9/2010 |
| CN | 201610728 U | 10/2010 |
| CN | 201610751 U | 10/2010 |
| CN | 201618530 U | 11/2010 |
| CN | 201661255 U | 12/2010 |
| CN | 101949382 | 1/2011 |
| CN | 201756927 U | 3/2011 |
| CN | 101414171 B | 5/2011 |
| CN | 102128011 A | 7/2011 |
| CN | 102140898 A | 8/2011 |
| CN | 102155172 A | 8/2011 |
| CN | 102182904 | 9/2011 |
| CN | 202000930 U | 10/2011 |
| CN | 202055781 U | 11/2011 |
| CN | 202082265 U | 12/2011 |
| CN | 202100216 U | 1/2012 |
| CN | 202100217 U | 1/2012 |
| CN | 202100815 U | 1/2012 |
| CN | 202124340 U | 1/2012 |
| CN | 202140051 U | 2/2012 |
| CN | 202140080 U | 2/2012 |
| CN | 202144789 U | 2/2012 |
| CN | 202144943 U | 2/2012 |
| CN | 202149354 U | 2/2012 |
| CN | 102383748 A | 3/2012 |
| CN | 202156297 U | 3/2012 |
| CN | 202158355 U | 3/2012 |
| CN | 202163504 U | 3/2012 |
| CN | 202165236 U | 3/2012 |
| CN | 202180866 U | 4/2012 |
| CN | 202181875 U | 4/2012 |
| CN | 202187744 U | 4/2012 |
| CN | 202191854 U | 4/2012 |
| CN | 202250008 U | 5/2012 |
| CN | 101885307 | 7/2012 |
| CN | 102562020 A | 7/2012 |
| CN | 202326156 U | 7/2012 |
| CN | 202370773 U | 8/2012 |
| CN | 202417397 U | 9/2012 |
| CN | 202417461 U | 9/2012 |
| CN | 102729335 A | 10/2012 |
| CN | 202463955 U | 10/2012 |
| CN | 202463957 U | 10/2012 |
| CN | 202467739 U | 10/2012 |
| CN | 202467801 U | 10/2012 |
| CN | 202531016 U | 11/2012 |
| CN | 202544794 U | 11/2012 |
| CN | 102825039 A | 12/2012 |
| CN | 202578592 U | 12/2012 |
| CN | 202579164 U | 12/2012 |
| CN | 202594808 U | 12/2012 |
| CN | 202594928 U | 12/2012 |
| CN | 202596615 U | 12/2012 |
| CN | 202596616 U | 12/2012 |
| CN | 102849880 A | 1/2013 |
| CN | 102889191 A | 1/2013 |
| CN | 202641535 U | 1/2013 |
| CN | 202645475 U | 1/2013 |
| CN | 202666716 U | 1/2013 |
| CN | 202669645 U | 1/2013 |
| CN | 202669944 U | 1/2013 |
| CN | 202671336 U | 1/2013 |
| CN | 202673269 U | 1/2013 |
| CN | 202751982 U | 2/2013 |
| CN | 102963629 A | 3/2013 |
| CN | 202767964 U | 3/2013 |
| CN | 202789791 U | 3/2013 |
| CN | 202789792 U | 3/2013 |
| CN | 202810717 U | 3/2013 |
| CN | 202827276 U | 3/2013 |
| CN | 202833093 U | 3/2013 |
| CN | 202833370 U | 3/2013 |
| CN | 102140898 B | 4/2013 |
| CN | 202895467 U | 4/2013 |
| CN | 202926404 U | 5/2013 |
| CN | 202935798 U | 5/2013 |
| CN | 202935816 U | 5/2013 |
| CN | 202970631 U | 6/2013 |
| CN | 103223315 A | 7/2013 |
| CN | 203050598 U | 7/2013 |
| CN | 103233714 A | 8/2013 |
| CN | 103233715 A | 8/2013 |
| CN | 103245523 A | 8/2013 |
| CN | 103247220 A | 8/2013 |
| CN | 103253839 A | 8/2013 |
| CN | 103277290 A | 9/2013 |
| CN | 103321782 A | 9/2013 |
| CN | 203170270 U | 9/2013 |
| CN | 203172509 U | 9/2013 |
| CN | 203175778 U | 9/2013 |
| CN | 203175787 U | 9/2013 |
| CN | 102849880 B | 10/2013 |
| CN | 203241231 U | 10/2013 |
| CN | 203244941 U | 10/2013 |

(56) References Cited

FOREIGN PATENT DOCUMENTS

| | | |
|---|---|---|
| CN | 203244942 U | 10/2013 |
| CN | 203303798 U | 11/2013 |
| CN | 102155172 B | 12/2013 |
| CN | 102729335 B | 12/2013 |
| CN | 103420532 A | 12/2013 |
| CN | 203321792 U | 12/2013 |
| CN | 203412658 | 1/2014 |
| CN | 203420697 U | 2/2014 |
| CN | 203480755 U | 3/2014 |
| CN | 103711437 A | 4/2014 |
| CN | 203531815 U | 4/2014 |
| CN | 203531871 U | 4/2014 |
| CN | 203531883 U | 4/2014 |
| CN | 203556164 U | 4/2014 |
| CN | 203558809 U | 4/2014 |
| CN | 203559861 U | 4/2014 |
| CN | 203559893 U | 4/2014 |
| CN | 203560189 U | 4/2014 |
| CN | 102704870 B | 5/2014 |
| CN | 203611843 U | 5/2014 |
| CN | 203612531 U | 5/2014 |
| CN | 203612843 U | 5/2014 |
| CN | 203614062 U | 5/2014 |
| CN | 203614388 U | 5/2014 |
| CN | 203621045 U | 6/2014 |
| CN | 203621046 U | 6/2014 |
| CN | 203621051 U | 6/2014 |
| CN | 203640993 U | 6/2014 |
| CN | 203655221 U | 6/2014 |
| CN | 103899280 A | 7/2014 |
| CN | 103923670 A | 7/2014 |
| CN | 203685052 U | 7/2014 |
| CN | 203716936 U | 7/2014 |
| CN | 103990410 A | 8/2014 |
| CN | 103993869 A | 8/2014 |
| CN | 203754009 U | 8/2014 |
| CN | 203754025 U | 8/2014 |
| CN | 203754341 U | 8/2014 |
| CN | 203756614 U | 8/2014 |
| CN | 203770264 U | 8/2014 |
| CN | 203784519 U | 8/2014 |
| CN | 203784520 U | 8/2014 |
| CN | 104057864 A | 9/2014 |
| CN | 203819819 U | 9/2014 |
| CN | 203823431 U | 9/2014 |
| CN | 203835337 U | 9/2014 |
| CN | 104074500 A | 10/2014 |
| CN | 203876633 U | 10/2014 |
| CN | 203876636 U | 10/2014 |
| CN | 203877364 U | 10/2014 |
| CN | 203877365 U | 10/2014 |
| CN | 203877375 U | 10/2014 |
| CN | 203877424 U | 10/2014 |
| CN | 203879476 U | 10/2014 |
| CN | 203879479 U | 10/2014 |
| CN | 203890292 U | 10/2014 |
| CN | 203899476 U | 10/2014 |
| CN | 203906206 U | 10/2014 |
| CN | 104150728 A | 11/2014 |
| CN | 104176522 A | 12/2014 |
| CN | 104196464 A | 12/2014 |
| CN | 104234651 A | 12/2014 |
| CN | 203971841 U | 12/2014 |
| CN | 203975450 U | 12/2014 |
| CN | 204020788 U | 12/2014 |
| CN | 204021980 U | 12/2014 |
| CN | 204024625 U | 12/2014 |
| CN | 204051401 U | 12/2014 |
| CN | 204060661 U | 12/2014 |
| CN | 104260672 A | 1/2015 |
| CN | 104314512 A | 1/2015 |
| CN | 204077478 U | 1/2015 |
| CN | 204077526 U | 1/2015 |
| CN | 204078307 U | 1/2015 |
| CN | 204083051 U | 1/2015 |
| CN | 204113168 U | 1/2015 |
| CN | 104340682 A | 2/2015 |
| CN | 104358536 A | 2/2015 |
| CN | 104369687 A | 2/2015 |
| CN | 104402178 A | 3/2015 |
| CN | 104402185 A | 3/2015 |
| CN | 104402186 A | 3/2015 |
| CN | 204209819 U | 3/2015 |
| CN | 204224560 U | 3/2015 |
| CN | 204225813 U | 3/2015 |
| CN | 204225839 U | 3/2015 |
| CN | 104533392 A | 4/2015 |
| CN | 104563938 A | 4/2015 |
| CN | 104563994 A | 4/2015 |
| CN | 104563995 A | 4/2015 |
| CN | 104563998 A | 4/2015 |
| CN | 104564033 A | 4/2015 |
| CN | 204257122 U | 4/2015 |
| CN | 204283610 U | 4/2015 |
| CN | 204283782 U | 4/2015 |
| CN | 204297682 U | 4/2015 |
| CN | 204299810 U | 4/2015 |
| CN | 103223315 B | 5/2015 |
| CN | 104594857 A | 5/2015 |
| CN | 104595493 A | 5/2015 |
| CN | 104612647 A | 5/2015 |
| CN | 104612928 A | 5/2015 |
| CN | 104632126 A | 5/2015 |
| CN | 204325094 U | 5/2015 |
| CN | 204325098 U | 5/2015 |
| CN | 204326983 U | 5/2015 |
| CN | 204326985 U | 5/2015 |
| CN | 204344040 U | 5/2015 |
| CN | 204344095 U | 5/2015 |
| CN | 104727797 A | 6/2015 |
| CN | 204402414 U | 6/2015 |
| CN | 204402423 U | 6/2015 |
| CN | 204402450 U | 6/2015 |
| CN | 103247220 B | 7/2015 |
| CN | 104803568 A | 7/2015 |
| CN | 204436360 U | 7/2015 |
| CN | 204457524 U | 7/2015 |
| CN | 204472485 U | 7/2015 |
| CN | 204473625 U | 7/2015 |
| CN | 204477303 U | 7/2015 |
| CN | 204493095 U | 7/2015 |
| CN | 204493309 U | 7/2015 |
| CN | 103253839 B | 8/2015 |
| CN | 104820372 A | 8/2015 |
| CN | 104832093 A | 8/2015 |
| CN | 104863523 A | 8/2015 |
| CN | 204552723 U | 8/2015 |
| CN | 204553866 U | 8/2015 |
| CN | 204571831 U | 8/2015 |
| CN | 204703814 U | 10/2015 |
| CN | 204703833 U | 10/2015 |
| CN | 204703834 U | 10/2015 |
| CN | 105092401 A | 11/2015 |
| CN | 103233715 B | 12/2015 |
| CN | 103790927 | 12/2015 |
| CN | 105207097 | 12/2015 |
| CN | 204831952 U | 12/2015 |
| CN | 204899777 U | 12/2015 |
| CN | 102602323 | 1/2016 |
| CN | 105240064 A | 1/2016 |
| CN | 204944834 | 1/2016 |
| CN | 205042127 U | 2/2016 |
| CN | 205172478 U | 4/2016 |
| CN | 103993869 B | 5/2016 |
| CN | 105536299 A | 5/2016 |
| CN | 105545207 A | 5/2016 |
| CN | 205260249 | 5/2016 |
| CN | 103233714 B | 6/2016 |
| CN | 104340682 B | 6/2016 |
| CN | 205297518 U | 6/2016 |
| CN | 205298447 U | 6/2016 |
| CN | 205391821 U | 7/2016 |
| CN | 205400701 U | 7/2016 |
| CN | 103277290 B | 8/2016 |

(56) References Cited

FOREIGN PATENT DOCUMENTS

| | | |
|---|---|---|
| CN | 104260672 B | 8/2016 |
| CN | 205477370 U | 8/2016 |
| CN | 205479153 U | 8/2016 |
| CN | 205503058 U | 8/2016 |
| CN | 205503068 U | 8/2016 |
| CN | 205503089 U | 8/2016 |
| CN | 105958098 A | 9/2016 |
| CN | 205599180 | 9/2016 |
| CN | 205599180 U | 9/2016 |
| CN | 106121577 A | 11/2016 |
| CN | 205709587 | 11/2016 |
| CN | 104612928 B | 12/2016 |
| CN | 106246120 A | 12/2016 |
| CN | 205805471 | 12/2016 |
| CN | 106321045 A | 1/2017 |
| CN | 205858306 | 1/2017 |
| CN | 106438310 A | 2/2017 |
| CN | 205937833 | 2/2017 |
| CN | 104563994 B | 3/2017 |
| CN | 206129196 | 4/2017 |
| CN | 104369687 B | 5/2017 |
| CN | 106715165 | 5/2017 |
| CN | 106761561 A | 5/2017 |
| CN | 105240064 B | 6/2017 |
| CN | 206237147 | 6/2017 |
| CN | 206287832 | 6/2017 |
| CN | 206346711 | 7/2017 |
| CN | 104563995 B | 9/2017 |
| CN | 107120822 | 9/2017 |
| CN | 107143298 A | 9/2017 |
| CN | 107159046 A | 9/2017 |
| CN | 107188018 A | 9/2017 |
| CN | 206496016 | 9/2017 |
| CN | 104564033 B | 10/2017 |
| CN | 107234358 A | 10/2017 |
| CN | 107261975 A | 10/2017 |
| CN | 206581929 | 10/2017 |
| CN | 104820372 B | 12/2017 |
| CN | 105092401 B | 12/2017 |
| CN | 107476769 A | 12/2017 |
| CN | 107520526 A | 12/2017 |
| CN | 206754664 | 12/2017 |
| CN | 107605427 A | 1/2018 |
| CN | 106438310 B | 2/2018 |
| CN | 107654196 A | 2/2018 |
| CN | 107656499 A | 2/2018 |
| CN | 107728657 A | 2/2018 |
| CN | 206985503 | 2/2018 |
| CN | 207017968 | 2/2018 |
| CN | 107859053 A | 3/2018 |
| CN | 207057867 | 3/2018 |
| CN | 207085817 | 3/2018 |
| CN | 105545207 B | 4/2018 |
| CN | 107883091 A | 4/2018 |
| CN | 107902427 A | 4/2018 |
| CN | 107939290 A | 4/2018 |
| CN | 107956708 | 4/2018 |
| CN | 207169595 | 4/2018 |
| CN | 207194873 | 4/2018 |
| CN | 207245674 | 4/2018 |
| CN | 108034466 A | 5/2018 |
| CN | 108036071 A | 5/2018 |
| CN | 108087050 A | 5/2018 |
| CN | 207380566 | 5/2018 |
| CN | 108103483 A | 6/2018 |
| CN | 108179046 A | 6/2018 |
| CN | 108254276 A | 7/2018 |
| CN | 108311535 A | 7/2018 |
| CN | 207583576 | 7/2018 |
| CN | 207634064 | 7/2018 |
| CN | 207648054 | 7/2018 |
| CN | 207650621 | 7/2018 |
| CN | 108371894 A | 8/2018 |
| CN | 207777153 | 8/2018 |
| CN | 108547601 A | 9/2018 |
| CN | 108547766 A | 9/2018 |
| CN | 108555826 A | 9/2018 |
| CN | 108561098 A | 9/2018 |
| CN | 108561750 A | 9/2018 |
| CN | 108590617 A | 9/2018 |
| CN | 207813495 | 9/2018 |
| CN | 207814698 | 9/2018 |
| CN | 207862275 | 9/2018 |
| CN | 108687954 A | 10/2018 |
| CN | 207935270 | 10/2018 |
| CN | 207961582 | 10/2018 |
| CN | 207964530 | 10/2018 |
| CN | 108789848 A | 11/2018 |
| CN | 108799473 | 11/2018 |
| CN | 108868675 A | 11/2018 |
| CN | 208086829 | 11/2018 |
| CN | 208089263 | 11/2018 |
| CN | 208169068 | 11/2018 |
| CN | 108979569 A | 12/2018 |
| CN | 109027662 A | 12/2018 |
| CN | 109058092 A | 12/2018 |
| CN | 208179454 | 12/2018 |
| CN | 208179502 | 12/2018 |
| CN | 208253147 | 12/2018 |
| CN | 208260574 | 12/2018 |
| CN | 109114418 A | 1/2019 |
| CN | 109141990 A | 1/2019 |
| CN | 208313120 | 1/2019 |
| CN | 208330319 | 1/2019 |
| CN | 208342730 | 1/2019 |
| CN | 208430982 | 1/2019 |
| CN | 208430986 | 1/2019 |
| CN | 109404274 A | 3/2019 |
| CN | 109429610 A | 3/2019 |
| CN | 109491318 A | 3/2019 |
| CN | 109515177 A | 3/2019 |
| CN | 109526523 A | 3/2019 |
| CN | 109534737 A | 3/2019 |
| CN | 208564504 | 3/2019 |
| CN | 208564516 | 3/2019 |
| CN | 208564525 | 3/2019 |
| CN | 208564918 | 3/2019 |
| CN | 208576026 | 3/2019 |
| CN | 208576042 | 3/2019 |
| CN | 208650818 | 3/2019 |
| CN | 208669244 | 3/2019 |
| CN | 109555484 A | 4/2019 |
| CN | 109682881 A | 4/2019 |
| CN | 208730959 | 4/2019 |
| CN | 208735264 | 4/2019 |
| CN | 208746733 | 4/2019 |
| CN | 208749529 | 4/2019 |
| CN | 208750405 | 4/2019 |
| CN | 208764658 | 4/2019 |
| CN | 109736740 A | 5/2019 |
| CN | 109751007 A | 5/2019 |
| CN | 208868428 | 5/2019 |
| CN | 208870761 | 5/2019 |
| CN | 109869294 A | 6/2019 |
| CN | 109882144 A | 6/2019 |
| CN | 109882372 A | 6/2019 |
| CN | 209012047 | 6/2019 |
| CN | 209100025 | 7/2019 |
| CN | 110080707 A | 8/2019 |
| CN | 110118127 A | 8/2019 |
| CN | 110124574 A | 8/2019 |
| CN | 110145277 A | 8/2019 |
| CN | 110145399 A | 8/2019 |
| CN | 110152552 A | 8/2019 |
| CN | 110155193 A | 8/2019 |
| CN | 110159225 A | 8/2019 |
| CN | 110159432 | 8/2019 |
| CN | 110159432 A | 8/2019 |
| CN | 110159433 A | 8/2019 |
| CN | 110208100 A | 9/2019 |
| CN | 110252191 A | 9/2019 |
| CN | 110284854 A | 9/2019 |
| CN | 110284972 A | 9/2019 |
| CN | 209387358 | 9/2019 |

(56) References Cited

FOREIGN PATENT DOCUMENTS

| | | | |
|---|---|---|---|
| CN | 110374745 A | 10/2019 | |
| CN | 209534736 | 10/2019 | |
| CN | 110425105 A | 11/2019 | |
| CN | 110439779 A | 11/2019 | |
| CN | 110454285 A | 11/2019 | |
| CN | 110454352 A | 11/2019 | |
| CN | 110467298 A | 11/2019 | |
| CN | 110469312 A | 11/2019 | |
| CN | 110469314 A | 11/2019 | |
| CN | 110469405 A | 11/2019 | |
| CN | 110469654 A | 11/2019 | |
| CN | 110485982 A | 11/2019 | |
| CN | 110485983 A | 11/2019 | |
| CN | 110485984 A | 11/2019 | |
| CN | 110486249 A | 11/2019 | |
| CN | 110500255 A | 11/2019 | |
| CN | 110510771 A | 11/2019 | |
| CN | 110513097 A | 11/2019 | |
| CN | 209650738 | 11/2019 | |
| CN | 209653968 | 11/2019 | |
| CN | 209654004 | 11/2019 | |
| CN | 209654022 | 11/2019 | |
| CN | 209654128 | 11/2019 | |
| CN | 209656622 | 11/2019 | |
| CN | 107849130 B | 12/2019 | |
| CN | 108087050 B | 12/2019 | |
| CN | 110566173 A | 12/2019 | |
| CN | 110608030 A | 12/2019 | |
| CN | 110617187 A | 12/2019 | |
| CN | 110617188 A | 12/2019 | |
| CN | 110617318 A | 12/2019 | |
| CN | 209740823 | 12/2019 | |
| CN | 209780827 | 12/2019 | |
| CN | 209798631 | 12/2019 | |
| CN | 209799942 | 12/2019 | |
| CN | 209800178 | 12/2019 | |
| CN | 209855723 | 12/2019 | |
| CN | 209855742 | 12/2019 | |
| CN | 209875063 | 12/2019 | |
| CN | 110656919 A | 1/2020 | |
| CN | 107520526 B | 2/2020 | |
| CN | 110787667 A | 2/2020 | |
| CN | 110821464 A | 2/2020 | |
| CN | 110833665 A | 2/2020 | |
| CN | 110848028 A | 2/2020 | |
| CN | 210049880 | 2/2020 | |
| CN | 210049882 | 2/2020 | |
| CN | 210097596 | 2/2020 | |
| CN | 210105817 | 2/2020 | |
| CN | 210105818 | 2/2020 | |
| CN | 210105993 | 2/2020 | |
| CN | 110873093 A | 3/2020 | |
| CN | 210139911 | 3/2020 | |
| CN | 110947681 A | 4/2020 | |
| CN | 111058810 A | 4/2020 | |
| CN | 111075391 A | 4/2020 | |
| CN | 210289931 | 4/2020 | |
| CN | 210289932 | 4/2020 | |
| CN | 210289933 | 4/2020 | |
| CN | 210303516 | 4/2020 | |
| CN | 211412945 | 4/2020 | |
| CN | 111089003 A | 5/2020 | |
| CN | 111151186 A | 5/2020 | |
| CN | 111167769 A | 5/2020 | |
| CN | 111169833 A | 5/2020 | |
| CN | 111173476 A | 5/2020 | |
| CN | 111185460 A | 5/2020 | |
| CN | 111185461 A | 5/2020 | |
| CN | 111188763 A | 5/2020 | |
| CN | 111206901 A | 5/2020 | |
| CN | 111206992 A | 5/2020 | |
| CN | 111206994 A | 5/2020 | |
| CN | 210449044 | 5/2020 | |
| CN | 210460875 | 5/2020 | |
| CN | 210522432 | 5/2020 | |
| CN | 210598943 | 5/2020 | |
| CN | 210598945 | 5/2020 | |
| CN | 210598946 | 5/2020 | |
| CN | 210599194 | 5/2020 | |
| CN | 210599303 | 5/2020 | |
| CN | 210600110 | 5/2020 | |
| CN | 111219326 A | 6/2020 | |
| CN | 111350595 A | 6/2020 | |
| CN | 210660319 | 6/2020 | |
| CN | 210714569 | 6/2020 | |
| CN | 210769168 | 6/2020 | |
| CN | 210769169 | 6/2020 | |
| CN | 210769170 | 6/2020 | |
| CN | 210770133 | 6/2020 | |
| CN | 210825844 | 6/2020 | |
| CN | 210888904 | 6/2020 | |
| CN | 210888905 | 6/2020 | |
| CN | 210889242 | 6/2020 | |
| CN | 111397474 A | 7/2020 | |
| CN | 111412064 A | 7/2020 | |
| CN | 111441923 A | 7/2020 | |
| CN | 111441925 A | 7/2020 | |
| CN | 111503517 A | 8/2020 | |
| CN | 111515898 A | 8/2020 | |
| CN | 111594059 A | 8/2020 | |
| CN | 111594062 A | 8/2020 | |
| CN | 111594144 A | 8/2020 | |
| CN | 211201919 | 8/2020 | |
| CN | 211201920 | 8/2020 | |
| CN | 211202218 | 8/2020 | |
| CN | 111608965 A | 9/2020 | |
| CN | 111664087 A | 9/2020 | |
| CN | 111677476 A | 9/2020 | |
| CN | 111677647 A | 9/2020 | |
| CN | 111692064 A | 9/2020 | |
| CN | 111692065 A | 9/2020 | |
| CN | 211384571 | 9/2020 | |
| CN | 211397553 | 9/2020 | |
| CN | 211397677 | 9/2020 | |
| CN | 211500955 | 9/2020 | |
| CN | 211524765 | 9/2020 | |
| DE | 4004854 | 8/1991 | |
| DE | 4241614 | 6/1994 | |
| DE | 102012018825 | 3/2014 | |
| DE | 102013111655 | 12/2014 | |
| DE | 102015103872 | 10/2015 | |
| DE | 102013114335 | 12/2020 | |
| EP | 0835983 | 4/1998 | |
| EP | 1378683 | 1/2004 | |
| EP | 2143916 | 1/2010 | |
| EP | 2613023 | 7/2013 | |
| EP | 3095989 | 11/2016 | |
| EP | 3211766 | 8/2017 | |
| EP | 3049642 | 4/2018 | |
| EP | 3354866 | 8/2018 | |
| EP | 3075946 | 5/2019 | |
| FR | 2795774 | 6/1999 | |
| GB | 474072 | 10/1937 | |
| GB | 1438172 | 6/1976 | |
| JP | S57135212 | 2/1984 | |
| KR | 20020026398 | 4/2002 | |
| RU | 13562 | 4/2000 | |
| WO | 1993020328 | 10/1993 | |
| WO | 2006025886 | 3/2006 | |
| WO | 2009023042 | 2/2009 | |
| WO | 20110133821 | 10/2011 | |
| WO | 2012139380 | 10/2012 | |
| WO | 2013158822 | 10/2013 | |
| WO | PCT/CN2012/074945 | 11/2013 | |
| WO | 2013185399 | 12/2013 | |
| WO | 2015158020 | 10/2015 | |
| WO | 2016/014476 | 1/2016 | |
| WO | 2016033983 | 3/2016 | |
| WO | 2016078181 | 5/2016 | |
| WO | 2016101374 | 6/2016 | |
| WO | 2016112590 | 7/2016 | |
| WO | 2017123656 A | 7/2017 | |
| WO | 2017213848 | 12/2017 | |
| WO | 2018031029 | 2/2018 | |

(56) References Cited

FOREIGN PATENT DOCUMENTS

| | | |
|---|---|---|
| WO | 2018038710 | 3/2018 |
| WO | 2018044293 | 3/2018 |
| WO | 2018044307 | 3/2018 |
| WO | 2018071738 | 4/2018 |
| WO | 2018101909 | 6/2018 |
| WO | 2018101912 | 6/2018 |
| WO | 2018106210 | 6/2018 |
| WO | 2018106225 | 6/2018 |
| WO | 2018106252 | 6/2018 |
| WO | 2018156131 | 8/2018 |
| WO | 2018075034 | 10/2018 |
| WO | 2018187346 | 10/2018 |
| WO | 2018031031 | 2/2019 |
| WO | 2019045691 | 3/2019 |
| WO | 2019046680 | 3/2019 |
| WO | 2019060922 | 3/2019 |
| WO | 2019126742 | 6/2019 |
| WO | 2019147601 | 8/2019 |
| WO | 2019169366 | 9/2019 |
| WO | 2019195651 | 10/2019 |
| WO | 2019200510 | 10/2019 |
| WO | 2019210417 | 11/2019 |
| WO | 2020018068 | 1/2020 |
| WO | 2020046866 | 3/2020 |
| WO | 2020072076 | 4/2020 |
| WO | 2020076569 | 4/2020 |
| WO | 2020097060 | 5/2020 |
| WO | 2020104088 | 5/2020 |
| WO | 2020131085 A1 | 6/2020 |
| WO | 2020211083 | 10/2020 |
| WO | 2020211086 | 10/2020 |
| WO | 2021041783 | 3/2021 |

OTHER PUBLICATIONS

Swagelok, The right valve for controlling flow direction? Check, 2016.

Technology.org, Check valves how do they work and what are the main type, 2018.

American Petroleum Institute. API 674: Positive Displacement Pumps—Reciprocating. 3rd ed. Washington, DC: API Publishing Services, 2010.

American Petroleum Institute. API 616: Gas Turbines for the Petroleum, Chemical, and Gas Industry Services. 5th ed. Washington, DC: API Publishing Services, 2011.

Karassik, Igor, Joseph Messina, Paul Cooper, and Charles Heald. Pump Handbook. 4th ed. New York: McGraw-Hill Education, 2008.

Weir SPM. Weir SPM General Catalog: Well Service Pumps, Flow Control Products, Manifold Trailers, Safety Products, Post Sale Services. Ft. Worth, TX: Weir Oil & Gas. May 28, 2016. https://www.pumpfundamentals.com/pumpdatabase2/weir-spm-general.pdf.

The Weir Group, Inc. Weir SPM Pump Product Catalog. Ft. Worth, TX: S.P.M. Flow Control, Inc. Oct. 30, 2017. https://manage.global.weir/assets/files/product%20brochures/SPM_2P140706_Pump_Product_Catalogue_View.pdf.

Shandong Saigao Group Corporation. Q4 (5W115) Quintuplex Plunger Pump. Jinan City, Shandong Province, China Saigao. Oct. 20, 2014. https://www.saigaogroup.com/product/q400-5w115-quintuplex-plunger-pump.html.

Marine Turbine. Turbine Powered Frac Units. Franklin, Louisiana: Marine Turbine Technologies, 2020.

Rotating Right. Quintuplex Power Pump Model Q700. Edmonton, Alberta, Canada: Weatherford International Ltd. https://www.rotatingright.com/pdf/weatherford/RR%2026-Weatherford%20Model%20Q700.pdf, 2021.

CanDyne Pump Services, Inc. Weatherford Q700 Pump. Calgary, Alberta, Canada: CanDyne Pump Services. Aug. 15, 2015. http://candyne.com/wp-content/uploads/2014/10/181905-94921.q700-quintuplex-pump.pdf.

Arop, Julius Bankong. Geomechanical review of hydraulic fracturing technology. Thesis (M. Eng.). Cambridge, MA: Massachusetts Institute of Technology, Dept. of Civil and Environmental Engineering. Oct. 29, 2013. https://dspace.mit.edu/handle/1721.1/82176.

AFGlobal Corporation, Durastim Hydraulic Fracturing Pump, A Revolutionary Design for Continuous Duty Hydraulic Fracturing, 2018.

Europump and Hydrualic Institute, Variable Speed Pumping: A Guide to Successful Applications, Elsevier Ltd, 2004.

Capstone Turbine Corporation, Capstone Receives Three Megawatt Order from Large Independent Oil & Gas Company in Eagle Ford Shale Play, Dec. 7, 2010.

Wikipedia, Westinghouse Combustion Turbine Systems Division, https://en.wikipedia.org/wiki/Westinghouse_Combustion_Turbine_Systems_Division, circa 1960.

Wikipedia, Union Pacific GTELs, https://en.wikipedia.org/wiki/Union_Pacific_GTELs, circa 1950.

Hci Jet Frac, Screenshots from YouTube, Dec. 11, 2010. https://www.youtube.com/watch?v=6HjXkdbFaFQ.

AFD Petroleum Ltd., Automated Hot Zone, Frac Refueling System, Dec. 2018.

Eygun, Christiane, et al., URTeC: 2687987, Mitigating Shale Gas Developments Carbon Footprint: Evaluating and Implementing Solutions in Argentina, Copyright 2017, Unconventional Resources Technology Conference.

Walzel, Brian, Hart Energy, Oil, Gas Industry Discovers Innovative Solutions to Environmental Concerns, Dec. 10, 2018.

Frac Shack, Bi-Fuel FracFueller brochure, 2011.

Pettigrew, Dana, et al., High Pressure Multi-Stage Centrifugal Pump for 10,000 psi Frac Pump—HPHPS FRAC Pump, Copyright 2013, Society of Petroleum Engineers, SPE 166191.

Elle Seybold, et al., Evolution of Dual Fuel Pressure Pumping for Fracturing: Methods, Economics, Field Trial Results and Improvements in Availability of Fuel, Copyright 2013, Society of Petroleum Engineers, SPE 166443.

Wallace, E.M., Associated Shale Gas: From Flares to Rig Power, Copyright 2015, Society of Petroleum Engineers, SPE-173491-MS.

Williams, C.W. (Gulf Oil Corp. Odessa Texas), The Use of Gas-turbine Engines in an Automated High-Pressure Water-Injection Stations; American Petroleum Institute; API-63-144 (Jan. 1, 1963).

Neal, J.C. (Gulf Oil Corp. Odessa Texas), Gas Turbine Driven Centrifugal Pumps for High Pressure Water Injection; American Institute of Mining, Metallurgical and Petroleum Engineers, Inc.; SPE-1888 (1967).

Porter, John A. (Solar Division International Harvester Co.), Modern Industrial Gas Turbines for the Oil Field American Petroleum Institute; Drilling and Production Practice; API-67-243 (Jan. 1, 1967).

Cooper et al., Jet Frac Porta-Skid—A New Concept in Oil Field Service Pump Equipments[sic]; Halliburton Services SPE-2706 (1969).

Ibragimov, É.S., Use of gas-turbine engines in oil field pumping units; Chem Petrol Eng; (1994) 30: 530. https://doi.org/10.1007/BF01154919. (Translated from Khimicheskaya i Neftyanoe Mashinostroenie, No. 11, pp. 24-26, Nov. 1994.).

Kas' yanov et al., Application of gas-turbine engines in pumping units complexes of hydraulic fracturing of oil and gas reservoirs; Exposition Oil & Gas; (Oct. 2012) (published in Russian).

Researchgate, Answer by Byron Woolridge, found at https://www.researchgate.net/post/How_can_we_improve_the_efficiency_of_the_gas_turbine_cycles, Jan. 1, 2013.

Filipović, Ivan, Preliminary Selection of Basic Parameters of Different Torsional Vibration Dampers Intended for use in Medium-Speed Diesel Engines, Transactions of Famena XXXVI-3 (2012).

Marine Turbine Technologies, 1 MW Power Generation Package, http://marineturbine.com/power-generation, 2017.

Business Week: Fiber-optic cables help fracking, cablinginstall.com. Jul. 12, 2013. https://www.cablinginstall.com/cable/article/16474208/businessweek-fiberoptic-cables-help-fracking.

Fracking companies switch to electric motors to power pumps, iadd-intl.org. Jun. 27, 2019. https://www.iadd-intl.org/articles/fracking-companies-switch-to-electric-motors-to-power-pumps/.

(56) References Cited

OTHER PUBLICATIONS

The Leader in Frac Fueling, suncoastresources.com. Jun. 29, 2015. https://web.archive.org/web/20150629220609/https://wwwsuncoastresources.com/oilfield/fueling-services/.
Mobile Fuel Delivery, atlasoil.com. Mar. 6, 2019. https://www.atlasoil.com/nationwide-fueling/onsite-and-mobile-fueling.
Frac Tank Hose (FRAC), 4starhose.com. Accessed: Nov. 10, 2019. http://www.4starhose.com/product/frac_tank_hose_frac.aspx.
Plos One, Dynamic Behavior of Reciprocating Plunger Pump Discharge Valve Based on Fluid Structure Interaction and Experimental Analysis. Oct. 21, 2015.
FMC Technologies, Operation and Maintenance Manual, L06 Through L16 Triplex Pumps Doc No. OMM50000903 Rev: E p. 1 of 66. Aug. 27, 2009.
Gardner Denver Hydraulic Fracturing Pumps GD 3000 https://www.gardnerdenver.com/en-us/pumps/triplex-fracking-pump-gd-3000.
Lekontsev, Yu M., et al. "Two-side sealer operation." Journal of Mining Science 49.5 (2013): 757-762.
Tom Hausfeld, GE Power & Water, and Eldon Schelske, Evolution Well Services, TM2500+ Power for Hydraulic Fracturing.
FTS International's Dual Fuel Hydraulic Fracturing Equipment Increases Operational Efficiencies, Provides Cost Benefits, Jan. 3, 2018.
CNG Delivery, Fracturing with natural gas, dual-fuel drilling with CNG, Aug. 22, 2019.
PbNG, Natural Gas Fuel for Drilling and Hydraulic Fracturing, Diesel Displacement / Dual Fuel & Bi-Fuel, May 2014.
Integrated Flow, Skid-mounted Modular Process Systems, https://ifsolutions.com/.
Cameron, A Schlumberger Company, Frac Manifold Systems, 2016.
ZSi-Foster, Energy | Solar | Fracking | Oil and Gas, https://www.zsi-foster.com/energy-solar-fracking-oil-and-gas.html.
JBG Enterprises, Inc., WS-Series Blowout Prevention Safety Coupling—Quick Release Couplings, http://www.jgbhose.com/products/WS-Series-Blowout-Prevention-Safety-Coupling.asp.
Halliburton, Vessel-based Modular Solution (VMS), 2015.
Chun, M. K., H. K. Song, and R. Lallemand. "Heavy duty gas turbines in petrochemical plants: Samsung's Daesan plant (Korea) beats fuel flexibility records with over 95% hydrogen in process gas." Proceedings of PowerGen Asia Conference, Singapore. 1999.
Wolf, Jurgen J., and Marko A. Perkavec. "Safety Aspects and Environmental Considerations for a 10 MW Cogeneration Heavy Duty Gas Turbine Burning Coke Oven Gas with 60% Hydrogen Content." ASME 1992 International Gas Turbine and Aeroengine Congress and Exposition. American Society of Mechanical Engineers Digital Collection, 1992.
Ginter, Timothy, and Thomas Bouvay. "Uprate options for the MS7001 heavy duty gas turbine." GE paper GER-3808C, GE Energy 12 (2006).
Chaichan, Miqdam Tariq. "The impact of equivalence ratio on performance and emissions of a hydrogen-diesel dual fuel engine with cooled exhaust gas recirculation." International Journal of Scientific & Engineering Research 6.6 (2015): 938-941.
Ecob, David J., et al. "Design and Development of a Landfill Gas Combustion System for the Typhoon Gas Turbine." ASME 1996 International Gas Turbine and Aeroengine Congress and Exhibition. American Society of Mechanical Engineers Digital Collection, 1996.
II-VI Marlow Industries, Thermoelectric Technologies in Oil, Gas, and Mining Industries, blog.marlow.com (Jul. 24, 2019).
B.M. Mahlalela, et al., Electric Power Generation Potential Based on Waste Heat and Geothermal Resources in South Africa, pangea.stanford.edu (Feb. 11, 2019).
Deparlmnent of Energy, United States of America, The Water-Energy Nexus: Challenges and Opportunities purenergypolicy.org (Jun. 2014).
Ankit Tiwari, Design of a Cooling System for a Hydraulic Fracturing Equipment, The Pennsylvania State University, The Graduate School, College of Engineering, 2015.
Up Yadav et al., Power Enhancement of Gas Turbine Plant by Intake Air Fog Cooling, Jun. 2015.
Mee Industries: Inlet Air Fogging Systems for Oil, Gas and Petrochemical Processing, Verdict Media Limited Copyright 2020.
M. Ahmadzadehtalatapeh et al.Performance enhancement of gas turbine units by retrofitting with inlet air cooling technologies (IACTs): an hour-by-hour simulation study, Journal of the Brazilian Society of Mechanical Sciences and Engineering, Mar. 2020.
Advances in Popular Torque-Link Solution Offer OEMs Greater Benefit, Jun. 21, 2018.
Emmanuel Akita et al., Mewbourne College of Earth & Energy, Society of Petroleum Engineers; Drilling Systems Automation Technical Section (DSATS); 2019.
PowerShelter Kit II, nooutage.com, Sep. 6, 2019.
EMPengineering.com, HEMP Resistant Electrical Generators / Hardened Structures HEMP/GMD Shielded Generators, Virginia.
Blago Minovski, Coupled Simulations of Cooling and Engine Systems for Unsteady Analysis of the Benefits of Thermal Engine Encapsulation, Department of Applied Mechanics, Chalmers University of Technology Göteborg, Sweden 2015.
J. Porteiro et al., Feasibility of a new domestic CHP trigeneration with heat pump: II. Availability analysis. Design and development, Applied Thermal Engineering 24 (2004) 1421-1429.
SPM® QEM 5000 E-Frac Pump Specification Sheet, Weir Group (2019) ("Weir 5000").
Green Field Energy Services Natural Gas Driven Turbine Frac Pumps HHP Summit Presentation, Yumpu (Sep. 2012), https://www.yumpu.com/en/document/read/49685291/turbine-frac-pump-assembly-hhp ("Green Field").
Dowell B908 "Turbo-Jet" Operator's Manual.
Jereh Debut's Super power Turbine Fracturing Pump, Leading the Industrial Revolution, Jereh Oilfield Services Group (Mar. 19, 2014), https://www.prnewswire.com/news-releases/jereh-debuts-super-power-turbine-fracturing-pump-leading-the-industrial-revolution-250992111.html.
Jereh Apollo 4500 Turbine Frac Pumper Finishes Successful Field Operation in China, Jereh Group (Feb. 13, 2015), as available on Apr. 20, 2015, https://web.archive.org/web/20150420220625/https://www. prnewswire.com/news-releases/jereh-apollo-4500-turbine-frac-pumper-finishes-successful-field-operation-in-china-300035829.html.
35% Economy Increase, Dual-fuel System Highlighting Jereh Apollo Frac Pumper, Jereh Group (Apr. 13, 2015), https://www.jereh.com/en/news/press-release/news-detail-7345.htm.
Hydraulic Fracturing: Gas turbine proves successful in shale gasfield operations, Vericor (2017), https://www.vericor.com/wp-content/uploads/2020/02/7.-Fracing-4500hp-Pump-China-En.pdf ("Vericor Case Study").
Jereh Apollo Turbine Fracturing Pumper Featured on China Central Television, Jereh Group (Mar. 9, 2018), https://www.jereh.com/en/news/press-release/news-detail-7267.htm.
Jereh Unveiled New Electric Fracturing Solution at OTC 2019, Jereh Group (May 7, 2019), as available on May 28, 2019, https://web.archive.org/web/20190528183906/https://www.pmewswire.com/news-releases/jereh-unveiled-new-electric-fracturing-solution-at-otc-2019-300845028.html.
Jereh Group, Jereh Fracturing Unit, Fracturing Spread, YouTube (Mar. 30, 2015), https://www.youtube.com/watch?v=PlkDbU5dE0o.
Transcript of Jereh Group, Jereh Fracturing Unit, Fracturing Spread, YouTube (Mar. 30, 2015).
Jereh Group, Jereh Fracturing Equipment. YouTube (Jun. 8, 2015), https://www.youtube.com/watch?v=m0vMiq84P4Q.
Transcript of Jereh Group, Jereh Fracturing Equipment, YouTube (Jun. 8, 2015), https://www.youtube.com/watch?v=m0vMiq84P4Q.
Ferdinand P. Beer et al., Mechanics of Materials (6th ed. 2012).
Weir Oil & Gas Introduces Industry's First Continuous Duty 5000-Horsepower Pump, Weir Group (Jul. 25, 2019), https://www.global. weir/newsroom/news-articles/weir-oil-and-gas-introduces-industrys-first-continuous-duty-5000-horsepower-pump/.
2012 High Horsepower Summit Agenda, Natural Gas for High Horsepower Applications (Sep. 5, 2012).

(56) References Cited

OTHER PUBLICATIONS

Review of HHP Summit 2012, Gladstein, Neandross & Associates https://www.gladstein.org/gna-conferences/high-horsepower-summit-2012/.

Green Field Energy Services Deploys Third New Hydraulic Fracturing System, Green Field Energy Services, Inc. (Jul. 11, 2012), https://www.prnewswire.com/news-releases/green-field-energy-services-deploys-third-new-hydraulic-fracturing-sp read-162113425.

Karen Boman, Turbine Technology Powers Green Field Multi-Fuel Frack Pump, Rigzone (Mar. 7, 2015), as available on Mar. 14, 2015, https://web.archive.org/web/20150314203227/https://www.rigzone.co m/news/oil-gas/a/124883/Turbine_Technology_Powers_Green_Field_ MultiFuel_Frack_Pump.

"Turbine Frac Units," WMD Squared (2012), https://wmdsquared.com/work/gfes-turbine-frac-units/.

Leslie Turj, Green Field asset sale called 'largest disposition industry has seen,' The INDsider Media (Mar. 19, 2014), http://theind.com/ article-16497-green-field-asset-sale-called-%E2%80%98largest-disposition-industry-has-seen%60.html.

Special-Purpose Couplings for Petroleum, Chemical, and Gas Industry Services, API Standard 671 (4th Edition) (2010.

The Application of Flexible Couplings for Turbomachinery, Jon R.Mancuso et al., Proceedings of the Eighteenthturbomachinery Symposium (1989).

Pump Control With Variable Frequency Drives, Kevin Tory, Pumps & Systems: Advances in Motors and Drives, Reprint from Jun. 2008.

Fracture Design and Stimulation, Mike Eberhard, P.E., Wellconstruction & Operations Technical Workshop Insupport of the EPA Hydraulic Fracturing Study, Mar. 10-11, 2011.

General Purpose vs. Special Purpose Couplings, Jon Mancuso, Proceedings of the Twenty-Third Turbomachinerysymposium (1994).

Overview of Industry Guidance/Best Practices on Hydraulic Fracturing (HF), American Petroleum Institute, © 2012.

API Member Companies, American Petroleum Institute, WaybackMachine Capture, https://web.archive.org/web/20130424080625/http://api.org/globalitems/globalheaderpages/membership/api-member-companies, accessed Jan. 4, 2021.

API's Global Industry Services, American Petroleum Institute, © Aug. 2020.

About API, American Petroleum Institute, https://www.api.org /about, accessed Dec. 30, 2021.

About API, American Petroleum Institute, WaybackMachine Capture, https://web.archive.org/web/20110422104346 /http://api.org/aboutapi/, captured Apr. 22, 2011.

Publications, American Petroleum Institute, WaybackMachine Capture, https://web.archive.org/web/20110427043936 /http://www.api.org:80/Publications/, captured Apr. 27, 2011.

Procedures for Standards Development, American Petroleum Institute, Third Edition (2006).

WorldCat Library Collections Database Records for API Standard 671 and API Standard 674, https://www.worldcat.org/title/positive-displacement-pumps-reciprocating/oclc/ 858692269&referer=brief_results, accessed Dec. 30, 2021; and https://www.worldcat.org/title/special-purpose-couplings-for-petroleum-chemical-and-gas-industry-services/oclc/871254217&referer=brief_results, accessed Dec. 22, 2021.

2011 Publications and Services, American Petroleum Institute (2011). Standards, American Petroleum Institute, WaybackMachine Capture, https://web.archive.org/web/20110207195046/http:/www.api.org/Standards/, captured Feb. 7, 2011; and https://web.archive.org/web/20110204112554/http://global.ihs.com/?RID=API1, captured Feb. 4, 2011.

IHS Markit Standards Store, https://global.ihs.com/doc_ detail.cfm?document_name=API%20STD%20674&item_s_key=00010672#doc-detail-history-anchor, accessed Dec. 30, 2021; and https://global.ihs.com/doc_detail.cfm?&input_doc _number=671&input_doc_title=&document_name=API%20STD%20671&item_s_key=00010669&item_key_date=890331&origin=DSSC, accessed Dec. 30, 2021.

De Gevigney et al., "Analysis of no-load dependent power losses in a planetary gear train by using thermal network method", International Gear Conference 2014: Aug. 26-28, 2014, Lyon, pp. 615-624.

"Honghua developing new-generation shale-drilling rig, plans testing of frac pump"; Katherine Scott; Drilling Contractor; May 23, 2013; accessed at https://www.drillingcontractor.org/honghua-developing-new-generation-shale-drilling-rig-plans-testing-of-frac-pump-23278.

\* cited by examiner

ONBOARD HEATER OF AUXILIARY SYSTEMS USING EXHAUST GASES AND ASSOCIATED METHODS

CROSS REFERENCE TO RELATED APPLICATION

This application claims priority to and the benefit of U.S. Provisional Application No. 62/704,556, filed May 15, 2020, titled "ONBOARD HEATER OF AUXILIARY SYSTEMS USING EXHAUST GASES AND ASSOCIATED METHODS", the entire disclosure of which is incorporated herein by reference.

TECHNICAL FIELD

The present disclosure generally relates to systems for energy recovery from exhaust engines and methods thereof. More specifically, the energy recovery systems may be used to recover heat from the exhaust of gas turbine engines. The systems and methods of the present disclosure may be used and implemented onboard a mobile fracturing trailer.

BACKGROUND OF THE DISCLOSURE

Hydraulic fracturing often is used to produce oil and gas in an economic manner from low permeability reservoir rocks, such as shale. Hydraulic fracturing restores or enhances productivity of a well by creating a conductive flow path of hydrocarbons between the reservoir rock and a wellbore. During hydraulic fracturing, a fluid initially is pumped under high pressure to fracture rock in a reservoir formation and open a flow channel. Thereafter, a proppant-carrying fluid, e.g., a fluid that comprises proppant in the form of granular solid and/or semi-solid components, e.g., sand, ceramics, is pumped to continue opening and widening the flow channel while suspending proppant inside it. The proppant, thus, keeps the flow path opened for the hydrocarbons to flow.

Hydraulic fracturing treatments may be performed using high powered gas turbine engines that power fracturing pumps to deliver fluids at a high pressure, specifically, above the fracture pressure of the rock in a reservoir formation.

High powered gas turbine engines have been used as power sources for a variety of industrial applications. During the use of high powered gas turbine engines, the exhaust system is an integral part of the design and operation of a successful turbine system. The primary working media for a gas turbine engine is air, and specifically, the mass flow of air into turbine engine inlet ducts must be expelled through the exhaust system. The exhaust systems must be designed to provide minimal back pressure on turbine exhaust ducts while also allowing the diffuser to reduce the velocity of the exhaust gases and increase a static pressure. Exhaust stack gases carry mass amounts of energy mostly identified in heat where temperatures of over 1000 degrees Fahrenheit are commonly found.

SUMMARY OF THE DISCLOSURE

While the turbine is expelling mass amounts of heat, portions of a gas turbine engine and other systems mounted to a fracturing trailer, for example, may benefit from being heated or pre-heated to an operating temperature before use. For example, oil used to lubricate a gear box or a fracturing pump may benefit from being at an operating temperature before being used in the gearbox or fracturing pump, respectively.

Embodiments of this disclosure relates to an exhaust energy recover system that is mounted to a mobile platform with an engine and is configured to recover energy in the form of heat from the exhaust gases of the engine. In addition, embodiments of this disclosure relates to methods of operating the exhaust energy recovery system and methods of cleaning or purging exhaust energy recover systems.

In accordance with an embodiment of the present disclosure, a mobile power system includes a transportation platform, an engine, a first heat distribution element, and an exhaust energy recovery system. The transportation platform may be a single trailer, for example. The engine is mounted to the transportation platform and includes an intake port and an exhaust duct. The engine may be a gas turbine engine and, more specifically, may be a dual-fuel dual-shaft gas turbine engine. The first heat distribution element is mounted to the transportation platform. The exhaust energy recovery system is mounted to the transportation platform and includes an inlet duct, an outlet duct, and a first heat exchanger. The inlet duct is positioned in communication with the exhaust duct and has an open configuration in which the inlet duct is configured to divert a first portion of exhaust gas from the exhaust duct into a recovery flow path and allow a second non-zero portion of the exhaust gas of the exhaust duct to be exhausted. The inlet duct also has a closed configuration in which the inlet duct is configured to prevent exhaust gas from flowing into the recovery flow path. The outlet duct in communication with the exhaust duct downstream of the inlet duct and is configured to return the first portion of the exhaust gas from the recovery flow path to the exhaust duct. The first heat exchanger is disposed in the recovery flow path between the inlet duct and the outlet duct. The first heat exchanger is associated with the first heat distribution element. The first heat exchanger is configured to receive exhaust gas from the recovery flow path, transfer heat from the received exhaust gas to fluid of the first heat distribution element within the first heat exchanger, and return the received exhaust gas to the recovery flow path.

In some embodiments, the exhaust energy recovery system includes a flushing system that is in communication with the recovery flow path. The flushing port, for example, may be configured to receive water such that the water flows through the recovery flow path and exits the outlet duct to purge residue from the recovery flow path.

In another embodiment of the present disclosure, an exhaust energy recovery system includes an inlet duct, an outlet duct, and a first heat exchanger. The inlet duct is positioned in communication, i.e., fluid flow communication, with an exhaust flow path. The inlet duct has an open configuration in which the inlet duct is configured to divert a first portion of the exhaust gas from the exhaust flow path to a recovery flow path and a low or a second non-zero portion of the exhaust gas of the exhaust flow path to be exhausted. The inlet duct also has a closed configuration in which the inlet duct is configured to prevent exhaust gas from flowing the recovery flow path. The outlet duct is positioned in communication with the exhaust flow path downstream of the inlet duct. The outlet duct is configured to return the first portion of the exhaust gas from the recovery flow path to the exhaust flow path. The first heat exchanger is disposed in the recovery flow path between the inlet duct and the outlet duct. The first heat exchanger is configured to receive exhaust gas from the recover flow path, transfer heat from the received exhaust gas to fluid within the first heat exchanger, and return the received exhaust gas to the recovery flow path.

In some embodiments, the exhaust energy recovery system includes a flushing port that is in communication with the recovery flow path. The flushing port is configured to receive water such that the water flows through the recovery flow path and exits the outlet duct to purge residue from the recovery flow path.

In another embodiment of the present disclosure, a method of recovering energy from exhaust gases of a gas turbine engine of a mobile power system includes operating the gas turbine engine mounted to a trailer and opening an inlet duct that is disposed in the exhaust duct to divert a portion of exhaust gas flowing form an exhaust duct of the engine to an exhaust energy recovery system mounted to the trailer. The diverted exhaust gas flows through a first heat exchanger of the exhaust energy recovery system to transfer heat from the exhaust gas to fluid of a first heat distribution element mounted to the trailer, and the exhaust gas is returned to the exhaust duct of the engine via an outlet duct of the exhaust energy recovery system that is in communication with or disposed within the exhaust duct downstream of the inlet duct.

In embodiments, the method also may include flushing the exhaust recovery system. The flushing, for example, in turn, may include verifying that the inlet duct is closed and injecting water into a flushing port such that the water flows through the exhaust energy recovery system and into the exhaust duct via the outlet duct to purge the exhaust energy recovery system.

Those skilled in the art will appreciate the benefits of various additional embodiments reading the following detailed description of the embodiments with reference to the below-listed drawing figures. It is within the scope of the present disclosure that the above-discussed aspects be provided both individually and in various combinations.

BRIEF DESCRIPTION OF THE DRAWINGS

According to common practice, the various features of the drawings discussed below are not necessarily drawn to scale. Dimensions of various features and elements in the drawings may be expanded or reduced to more clearly illustrate the embodiments of the disclosure.

Corresponding parts are designated by corresponding reference numbers throughout the drawings.

DETAILED DESCRIPTION

Figure 1:
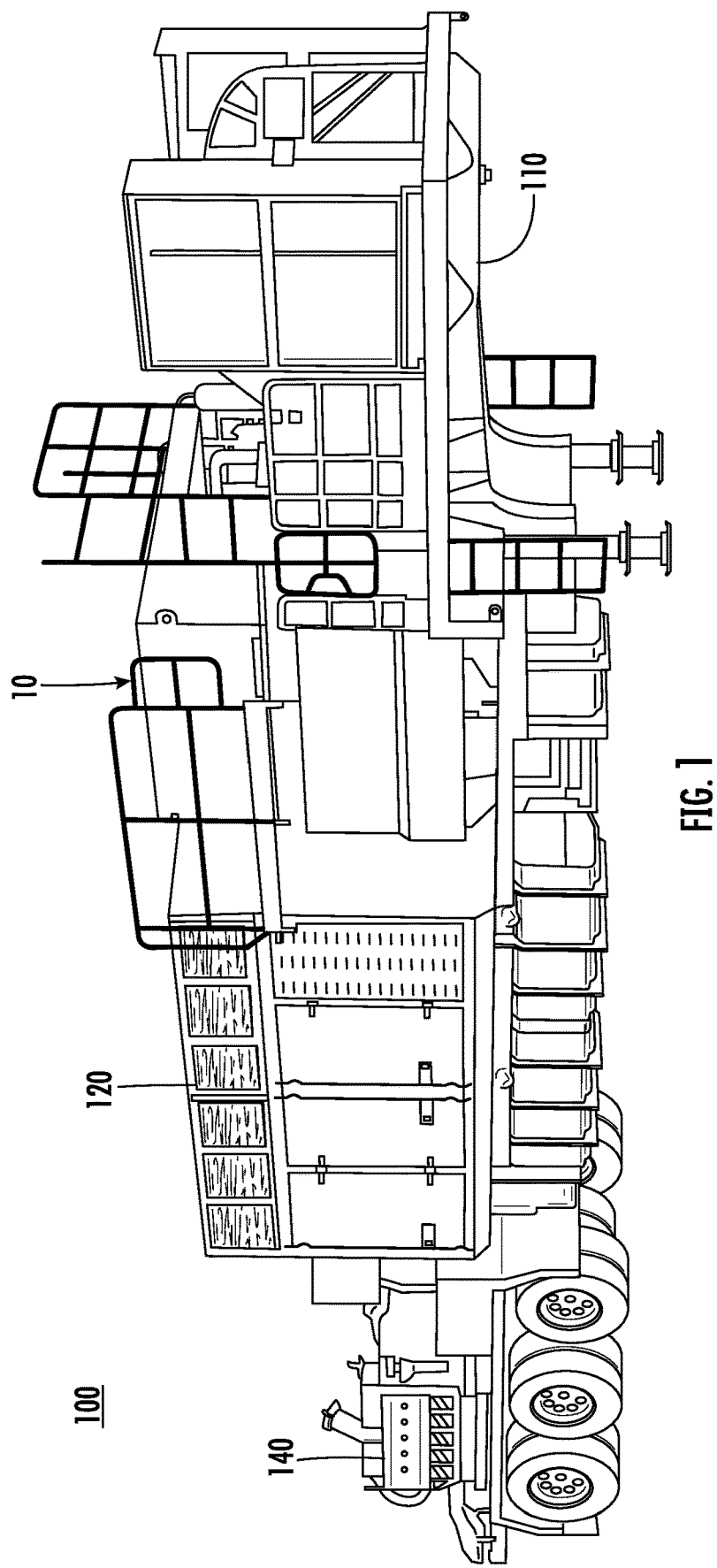
FIG. 1 is a perspective view of an exemplary mobile power system provided in accordance with the present disclosure.

The present disclosure will now be described more fully hereinafter with reference to example embodiments thereof with reference to the drawings in which like reference numerals designate identical or corresponding elements in each of the several views. These example embodiments are described so that this disclosure will be thorough and complete, and will fully convey the scope of the disclosure to those skilled in the art. Features from one embodiment or aspect may be combined with features from any other embodiment or aspect in any appropriate combination. For example, any individual or collective features of method aspects or embodiments may be applied to apparatus, product, or component aspects or embodiments and vice versa. The disclosure may be embodied in many different forms and should not be construed as limited to the embodiments set forth herein; rather, these embodiments are provided so that this disclosure will satisfy applicable legal requirements. As used in the specification and the appended claims, the singular forms "a," "an," "the," and the like include plural referents unless the context clearly dictates otherwise. In addition, while reference may be made herein to quantitative measures, values, geometric relationships or the like, unless otherwise stated, any one or more if not all of these may be absolute or approximate to account for acceptable variations that may occur, such as those due to manufacturing or engineering tolerances or the like.

The embodiments of the present disclosure are directed to mobile power systems, for example, mobile power systems that are mounted to a transportation platform that are transportable on and off highways. In particular, embodiments of the present disclosure are directed to energy recovery systems that are mounted to a transportation platform with a mobile power system to distribute, recover, and reuse heat energy from exhaust of the mobile power system. Some embodiments of the present disclosure are directed to energy recovery systems that are mounted to hydraulic fracturing pumpers. as will be understood by those skilled in the art.

FIG. 1 illustrates an exemplary mobile power system 100 is provided in accordance with an embodiment of the present disclosure. The exemplary mobile power system 100 includes transportation platform 110, an engine 120, a power unit 140, and an exhaust energy recovery system 10. The transportation platform 110 is shown as a single trailer with the entire mobile power system 100 and components thereof mounted thereto. For example, it may be advantageous to have the entire mobile power system 100 mounted to a single trailer such that setup and startup of the mobile power system 100 does not require onsite assembly of the mobile power system 100. In addition, mounting the entire mobile power system 100 to a single trailer may decrease a footprint of the mobile power system 100. The transportation platform 110 may be a trailer that may be pulled by a tractor (not shown) on and off public highways. In some embodiments, the transportation platform may include more than one trailer.

The engine 120 is mounted to the transportation platform 110 and may be any suitable engine including, but not limited to, an internal combustion engine or a gas turbine engine. The engine 120 may be a single fuel engine operating on gasoline, natural gas, well gas, field gas, diesel, or other suitable fuel. In some embodiments, the engine 120 may be a dual fuel engine operating on a liquid fuel and a gaseous fuel. In certain embodiments, the engine 120 is a dual fuel gas turbine engine that operates on diesel fuel, e.g., #2 diesel as will be understood by those skilled in the art, and on a gaseous fuel, e.g., natural gas, well gas, or field gas. In particular embodiments, the engine 120 is a dual fuel, dual shaft gas turbine engine that operates on a liquid fuel such as diesel fuel and a gaseous fuel such as natural, well gas, or field gas.

The engine 120 is operably coupled to the power unit 140 such that the engine 120 drives the power unit 140 to supply power to a system external of the mobile power system 100. As shown, the power unit 140 is a high pressure pump, such as those that include hydraulic fracturing pumps, that is configured to supply power in the form of high pressure fluid. The power unit 140 may be a high pressure single acting reciprocating pump or a high pressure centrifugal pump. In certain embodiments, the power unit 140 may be a generator configured to produce electric power. The engine 120 may be operably coupled to the power unit 140 by a gearbox (not explicitly shown). The gearbox may decrease a speed of an input from the engine 120 while increasing a torque or increase the speed of an input from the engine 120 while decreasing a torque. In some embodiments, the gearbox is a transmission that allows for adjustment of the ratio between a speed of rotation of the input from the engine 120 to a speed of rotation of the power unit 140. In certain embodiments, the transmission has a set number of speed ratios. In particular embodiments, the transmission is continuously variable through a wide range of speed ratios.

Figure 2:
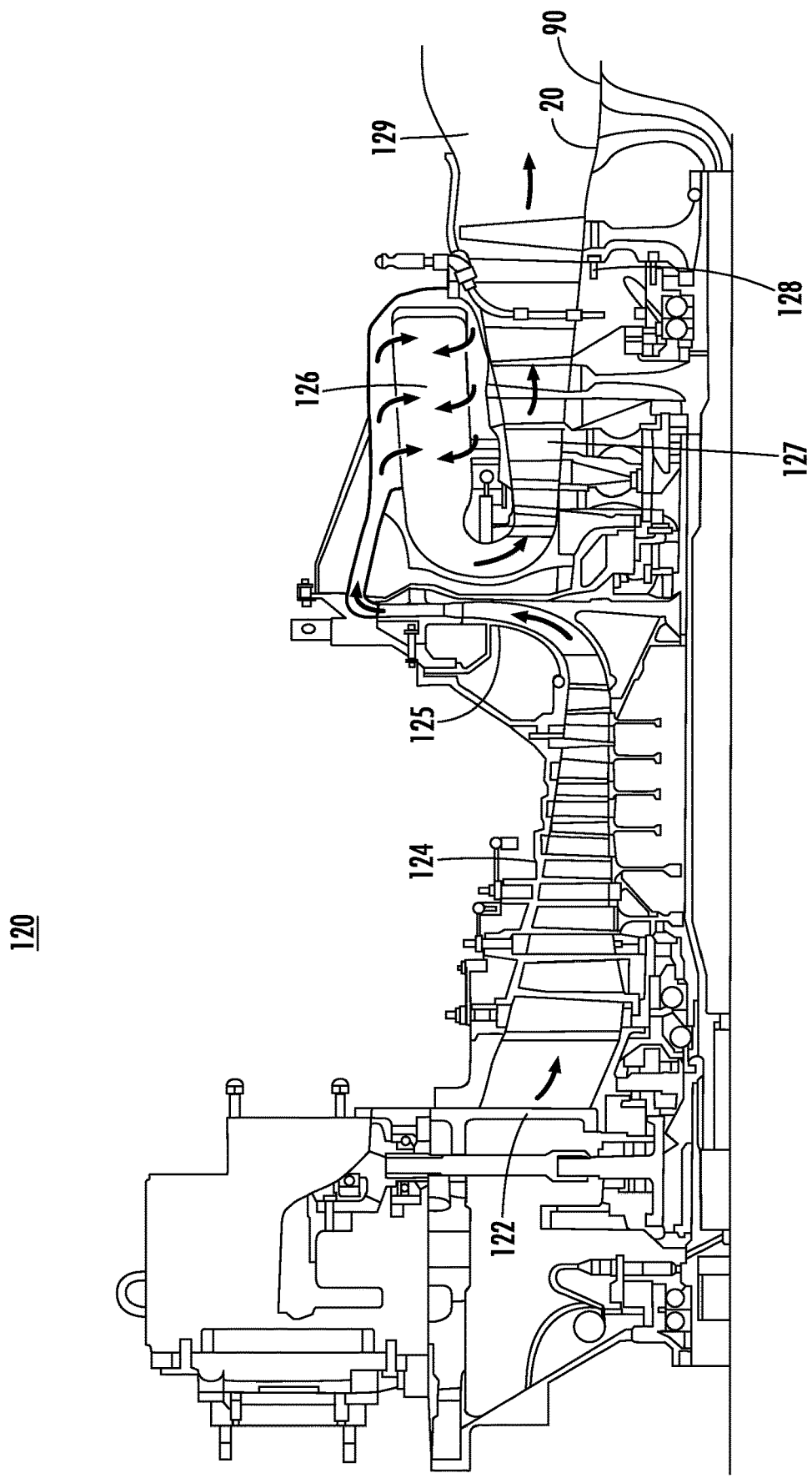
FIG. 2 is a schematic view of an exemplary engine of the mobile power system of FIG. 1 according to an embodiment of the present disclosure.

FIG. 2 illustrates a schematic of an exemplary engine 120 shown as a dual-shaft gas turbine engine. The engine 120 includes an intake 122, an axial compressor 124, a radial compressor 125, a combustion chamber 126, a producer turbine 127, a power turbine 128, and an exhaust duct 129 as will be understood by those skilled in the art. As air moves through the compressors 124, 125 from the intake 122 to the combustion chamber 126, the pressure of the air is increased. As the air moves through the combustion chamber 126, fuel is mixed with the air and ignited such that the temperature of the air is increased. As the air flows through the producer and power turbines 127, 128 the pressure of the air is decreased as the air rotates the turbines 127, 128. The air continues through engine 120 and out the exhaust duct 129 to be released to the environment.

Figure 3:
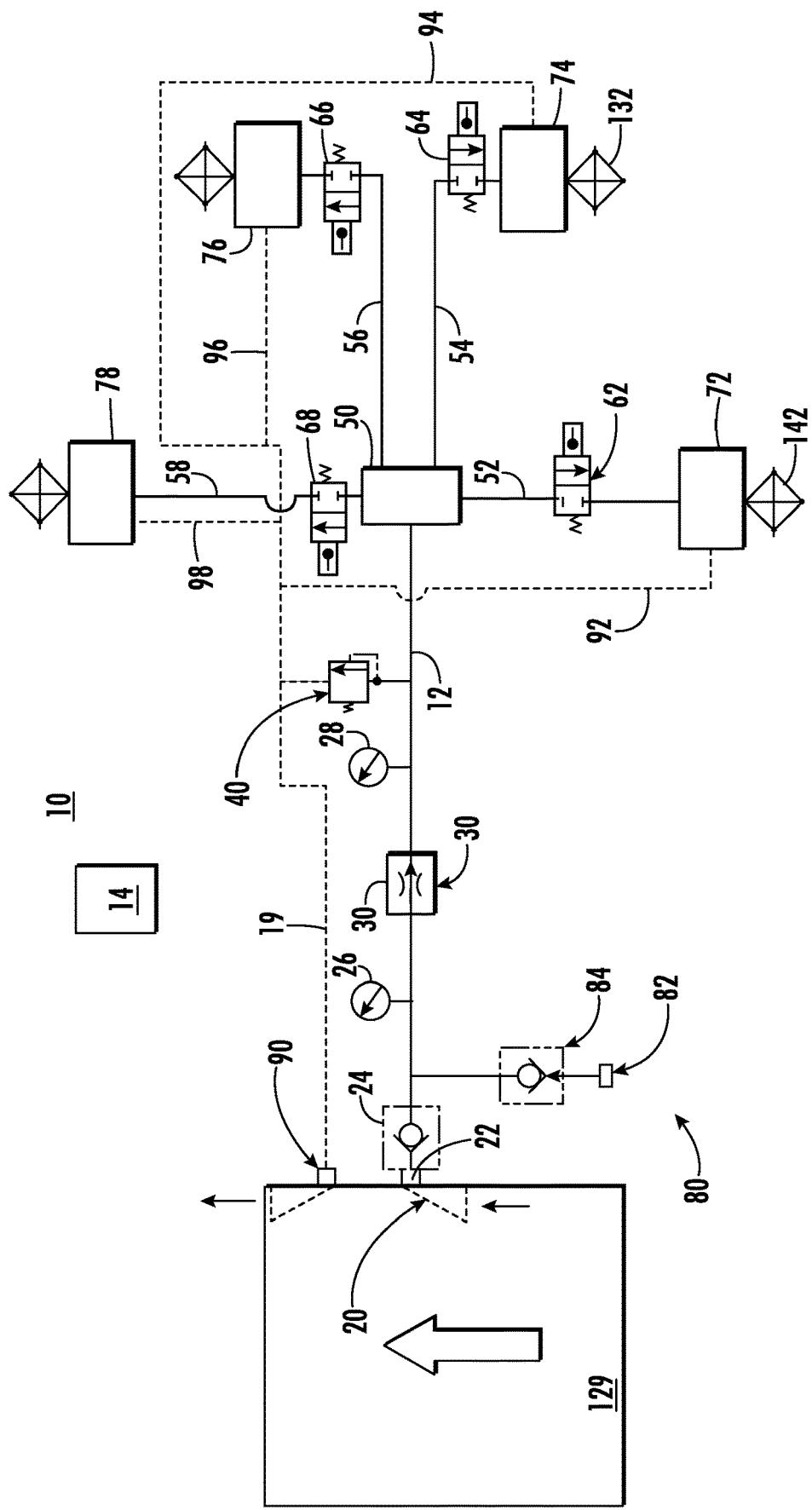
FIG. 3 is a schematic view of an exemplary exhaust energy recovery system according to an embodiment of the present disclosure.

FIG. 3, in turn, illustrates a schematic of an exemplary exhaust energy recovery system (EERS) 10 in accordance with an embodiment of the present disclosure. The EERS 10 is configured to draw a portion of the air from the exhaust duct 129 in the form of exhaust gas and to recover energy from the exhaust gas to heat one or more components or systems on the transportation platform (FIG. 1) and return the exhaust gas to the exhaust duct 129. The EERS 10 defines a recovery flow path that in order of downstream gas flow includes an inlet duct 20, a gas supply line 12, one or more heat exchangers 72, 74, 76, 78, a gas return line 19, and an outlet duct 90.

The inlet duct 20 is disposed within the exhaust duct 129 and is configured to draw a portion of exhaust gas flowing out of the exhaust duct 129 into the gas supply line 12. The inlet duct 20 is sized to draw a portion of the exhaust gas flowing out of the exhaust duct 129 while minimally or negligibly increasing backpressure within the exhaust duct 129. The inlet duct 20 may protrude into the exhaust duct 129, or the inlet duct 20, for example, also may be an opening in a wall defining the exhaust duct 129. The inlet duct 20 may include an inlet valve 22 positioned at or downstream of the inlet duct 20 within the gas supply line 12. The inlet valve 22 is configured to open the inlet duct 20 to draw exhaust gas into the gas supply line 12 or close the inlet duct 20 to prevent exhaust gas from flowing into the gas supply line 12. The inlet valve 22 may have an open position, a closed position, and may be adjustable to one or more discrete position between the open and closed positions. The inlet valve 22 may include a mechanical linkage for opening and closing the inlet duct 20. In particular embodiments, the inlet valve 22 may open the inlet duct 20 by extending the inlet duct 20 into the exhaust duct 129 and close the inlet duct 20 by withdrawing the inlet duct 20 from the exhaust duct 129. In some embodiments, the inlet valve 22 may be a one-way valve that is configured to prevent backflow through the gas supply line 12 into the exhaust duct 129 through the inlet duct 20.

The gas supply line 12 may include a check valve 24 positioned downstream of the inlet duct 20 and/or the inlet valve 22 that prevents backflow through the gas supply line 12, e.g., flow towards the inlet duct 20. The check valve 24 may be a poppet valve or a ball and metal seat valve. Seals within the check valve may be metal to metal seals such that the check valve 24 is rated for temperatures at or above 900° F. Exemplary check valves are available from SSP Corporation of Twinsburg, Ohio, as will be understood by those skilled in the art.

The gas supply line 12 continues from the inlet duct 20, the inlet valve 22, or check valve 24 towards one or more heat exchangers 72, 74, 76, 78. Between the inlet duct 20 and the heat exchangers 72, 74, 76, 78, the EERS 10 may include a flow restrictor 30. The flow restrictor 30 is configured to regulate an amount of exhaust gas within the gas supply line 12 downstream of the flow restrictor 30. The flow restrictor 30 may limit the pressure of exhaust gas flowing through the flow restrictor 30 to a maximum operating pressure. The maximum operating pressure may be in a range of 80 to 125 pounds per square inch in gauge (PSIG), for example. The flow restrictor 30 may be a Habonim like valve, for example, as will be understood by those skilled in the art. An exemplary flow restrictor is available from Watson McDaniel of Pottstown, Pa., as will be understood by those skilled in the art.

The gas supply line 12 may include a pressure gauge 26 upstream of the flow restrictor 30 and/or may include a pressure gauge 28 downstream of the flow restrictor 30. The pressure gauges 26, 28 may provide a pressure to one or more control systems of the EERS 10, e.g., EERS controller 14. For example, downstream of the flow restrictor 30 and upstream of the heat exchangers 72, 74, 76, 78, the EERS 10 may include a pressure relief valve 40 that is in communication on an upstream side with the gas supply line 12 and on a downstream side with the gas return line 19. The pressure relief valve 40 may be configured to open when a pressure within the gas supply line 12 is greater than a predetermined pressure or to prevent fluid from flowing through the gas supply line 12 downstream of the pressure relief valve 40 as described in greater detail below. For example, the pressure relief valve 40 may be in communication with the pressure gauge 28 and configured to open when the pressure gauge measures a pressure greater than a predetermined pressure. The pressure relief valve 40 may be a one-way valve to prevent flow from the gas return line 19 into the gas supply line 12.

As further illustrated in FIG. 3, the EERS 10 may include a manifold 50 positioned downstream of the pressure relief valve 40. The manifold 50 receives the gas supply line 12 and provides separate gas supply paths 52, 54, 56, 58 to the heat exchangers 72, 74, 76, 78. The manifold 50 allows for selective distribution of exhaust gas from the gas supply line 12 to the heat exchangers 72, 74, 76, 78. The gas supply paths 52, 54, 56, 58 are similar to one another. As such, only the first gas supply path 52 will be described for brevity.

The first gas supply path 52 extends from an upstream end that is in communication with the manifold 50 to the first heat exchanger 72 which is in communication with the downstream end thereof. The first gas supply path 52 includes a control valve 62 disposed between the upstream and downstream ends thereof. The control valve 62 has an open configuration in which the control valve 62 allows exhaust gas to flow through the first gas supply path 52 from the manifold 50 and into the first heat exchanger 72 and has a closed configuration in which the control valve 62 prevents exhaust gas from flowing through the first gas supply path 52 from the manifold 50. The control valve 62 may be a thermostatically controlled control valve, as will be understood by those skilled in the art, that includes temperature sensor configured to measure a temperature of a heat distribution element of the mobile power system 100, e.g., an oil reservoir, gas reservoir, fuel reservoir. As shown, the control valve 62 is associated with a reservoir of lubrication oil 142 for the power unit 140 (FIG. 1) and includes a temperature probe or sensor disposed within the reservoir 142. The control valve 62 may be configured to open in response to the temperature sensor indicating a temperature within the reservoir 142 is at or below a first predetermined temperature and may be configured to close in response to the temperature sensor indicating a temperature within the reservoir 142 is at or above a second predetermined temperature. The second predetermined temperature may be an operating temperature of the lubrication oil. The control valve 62 may have a plurality of open positions to control a flow of exhaust gas through the control valve 62 when the temperature sensor indicates a temperature within the reservoir 142 is between the first and second predetermined temperatures. In some embodiments, the control valve 62 may be in communication with the EERS controller 14 such that the control valve 62 may be opened and/or closed in response to signals from the EERS controller 14. When the control valve 62 is open, exhaust gas flows through the gas supply path 52 into the heat exchanger 72 where heat from the exhaust gas is transferred to a media to be heated, e.g., lubrication oil in the reservoir 142.

The pressure relief valve 40 and/or the control valves 62, 64, 66, 68 may be metal seated valves capable of operating with the high temperature exhaust gas. The control valves 62, 64, 66, 68 may have an orifice size of less than 3/32 of an inch and the pressure relief valve 40 may have an orifice in a range of 7/64 to 1/4 of an inch. Exemplarily valves are available from High Pressure Equipment of Erie, Pa. and Autoclave Engineers of Erie, Pa., as will be understood by those skilled in the art.

Figure 4:
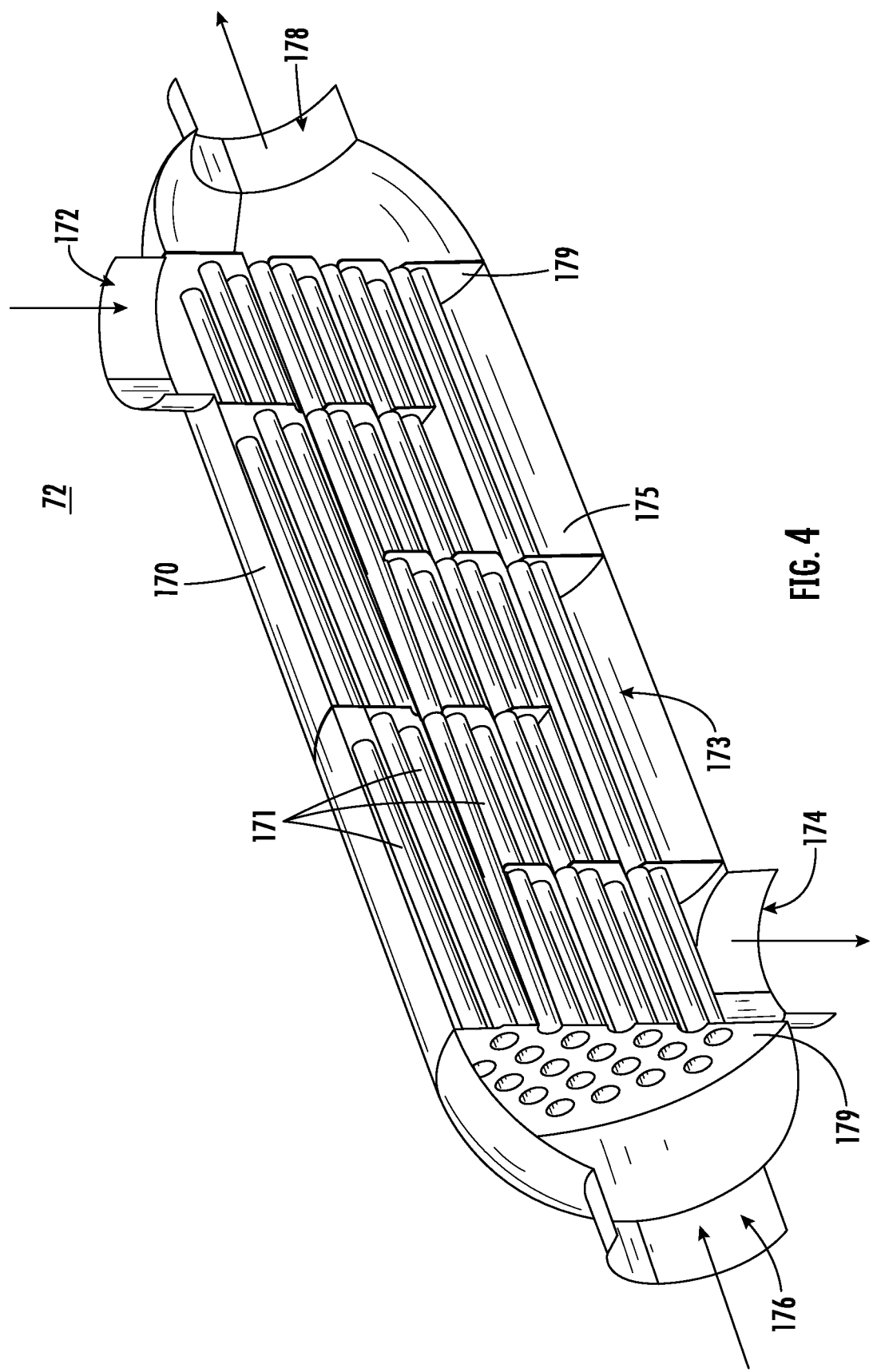
FIG. 4 is a schematic view of a heat exchanger of the exhaust energy recovery system of FIG. 3 according to an embodiment of the present disclosure.

FIG. 4 illustrates an exemplary heat exchanger 72 in accordance with an embodiment of the present disclosure. The heat exchanger 72 may be a shell and tube heat exchanger, for example, that includes a shell 170 and a plurality of tubes 171 that extend through a cavity 173 defined by the shell 170. The cavity 173 is defined within the shell 170 between end plates 179. The tubes 171 extend between the end plates 179 to interconnect chambers or plenums on either side of cavity 173. The shell 170 includes a gas inlet 172, a gas outlet 174, a media inlet 176, and a media outlet 178. The gas inlet 172 receives exhaust gas from the gas supply path 52 (FIG. 3) such that the exhaust gas flows through the cavity 173 and exits the gas outlet 174 into a gas return path 92 such that the exhaust gas is returned to the gas return line 19. The cavity 173 may include one or more baffles 175 that create a tortured path or an extended path within the cavity 173 to increase a duration the exhaust gas is within the cavity 173. The media inlet 176 flows into a plenum positioned along one side of the cavity such that the media flows through the cavity 173 within the tubes 171 to the plenum on the other side of the cavity 173 and exits through the media outlet 178. When the media is within the tubes 171, the media receives heat from the exhaust gas flowing through the cavity 173. In some embodiments, the media may flow through the cavity 173, and the exhaust gas may flow through the tubes 171. While the heat exchanger 72 is illustrated as a shell and tube heat exchanger, other types of heat exchangers may also be used as will be understood by those skilled in the art.

The heat exchangers 72, 74, 76, 78 may be a shell and tube heat exchanger as shown in FIG. 4. Additionally or alternatively, the heat exchangers 72, 74, 76, 78 may include a heat fan that blows across heating coils towards a reservoir such that the reservoir receives heat from the heat exchanger. The heat exchangers 72, 74, 76, 78 may be associated with a variety of heat distribution elements of the mobile power system 100 including, but not limited to, the reservoir of lubrication oil 142 of the power unit 149, a reservoir of lubrication oil 132 (FIG. 3) for the gear box, a fuel line, or a fuel reservoir.

Also, as shown in FIG. 3, the gas return paths 92, 94, 96, 98 accumulate into the gas return line 19 such that exhaust gas from the heat exchangers 72, 74, 76, 78 is returned to the exhaust duct 20 via the outlet duct 90. The outlet duct 90 is disposed within the exhaust duct 20 downstream of the inlet duct 20. The gas return paths 92, 94, 96, 98 and the gas return line 19 may have one or more check valves (not shown) that allow flow downstream towards the exhaust duct 20 and prevent backflow upstream towards the heat exchangers 72, 74, 76, 78. Returning the exhaust gas to the exhaust duct 20 allows for a single point of exhaust for the mobile power system 100 (see, e.g., FIG. 1).

In embodiments of the disclosure, the EERS 10 may include a cleaning and flushing system 80 that is configured to clean the EERS 10 and to purge the EERS 10 of residue and/or particulates that may accumulate therewithin. The flushing system 80 may include a flushing port 82 and a check valve 84. The flushing port 82 is configured to receive a cleaning liquid, e.g., water, cleaning agent, or combinations thereof, such that the cleaning liquid may be distributed through the EERS 10 to clean or to purge the EERS 10. For example, the cleaning liquid may be injected into the EERS 10 via the flushing port 82. The check valve 84 is similar to the other check valves detailed herein, e.g., check valve 24, that permit flow in the EERS 10 downstream while preventing backflow within the EERS 10. The flushing port 82 and/or the check valve 84 may be in communication with the EERS controller 14.

Figure 5:
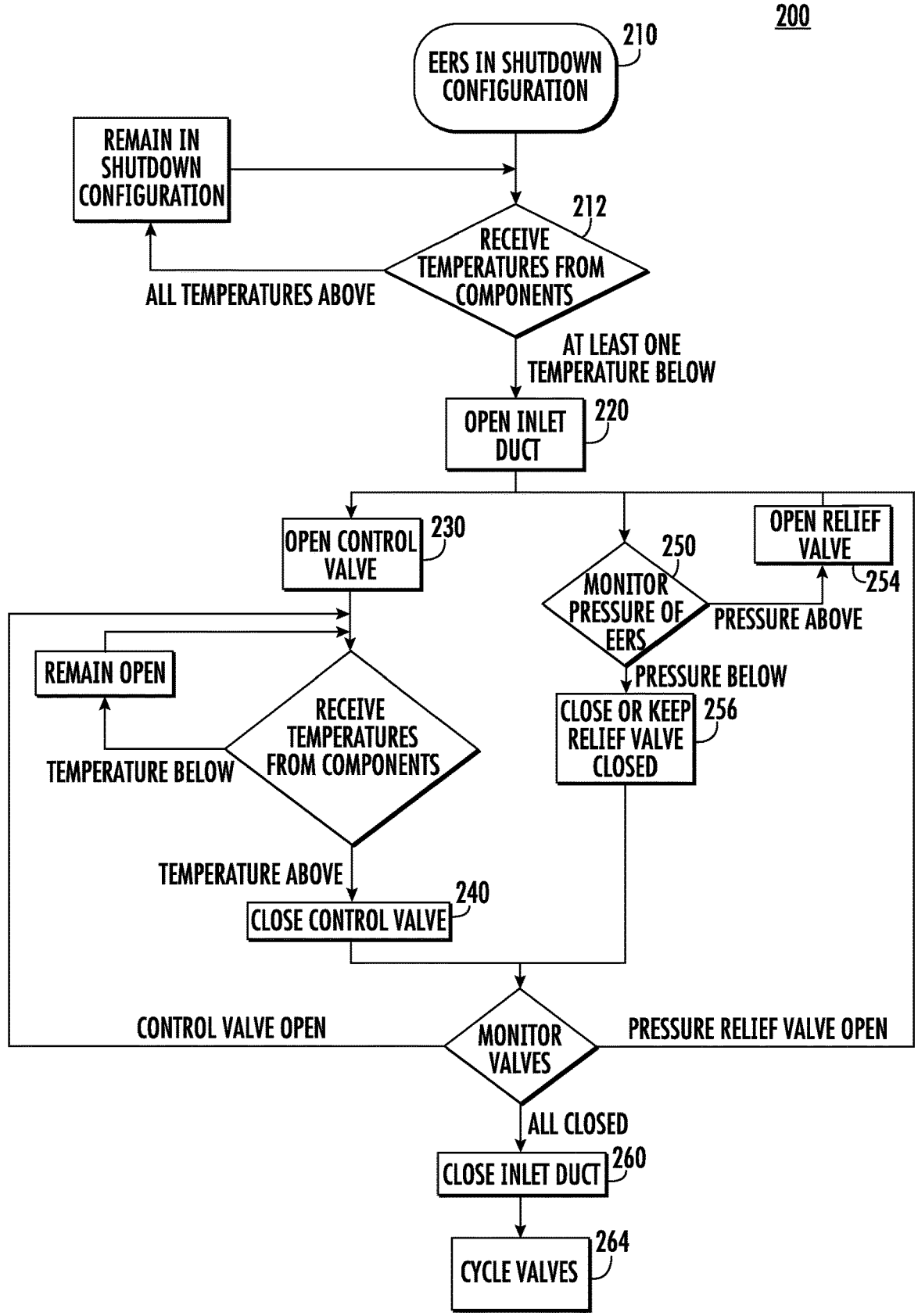
FIG. 5 is a flowchart of a method of operating an exhaust energy recovery system according to an embodiment of the present disclosure.

FIG. 5 illustrates an embodiment of a method of heating components of a system with energy recovered from exhaust gases in accordance with the disclosure, and with reference to the mobile power system 100 of FIG. 1 and the EERS 10 of FIG. 3 is referred to generally as method 200. In an initial or shutdown configuration, the inlet duct 20, the pressure relief valve 40, and the control valves 62, 64, 66, 68 of the EERS 10 are in a closed position such that gas or fluid flow within the EERS 10 is prevented (Step 210). When the engine 120 is running, the EERS controller 14 monitors temperatures or receives signals including temperatures of components or fluid reservoirs of the mobile power system 100 that are associated with the EERS 10, e.g., the lubrication reservoir 142 of the power unit 140, a lubrication reservoir 132 of the gearbox (Step 212). When the temperatures of one or more of the components or fluid reservoirs is below a predetermined minimum temperature for the particular component or fluid reservoir, e.g., the lubrication reservoir 142, the EERS controller 14 opens the inlet duct 20 such that a portion of the exhaust gas exiting the engine 120 through the exhaust duct 129 is diverted into the gas supply line 12 (Step 220). It will be appreciated that only a portion of the exhaust gases of the exhaust duct 129 is diverted with a non-zero portion of the exhaust gases continuing past the inlet duct 20. In some embodiments, the EERS 10 diverts a range of 0.5% to 20% of the exhaust gas from the exhaust duct 129.

When the inlet duct 20 is open, exhaust gas flows into the gas supply line 12 to the manifold 50. The EERS controller 14 may provide a signal to one or more of the control valves 62, 64, 66, 68 associated with a component or reservoir that is below a respective minimum temperature such that exhaust gas flows from the manifold 50 into a gas supply path 52, 54, 56, 58 associated with the respective control valve 62, 64, 66, 68 (Step 230). In certain embodiments, the control valves 62, 64, 66, 68 receive temperature signals from a temperature sensor associated with the respective component or reservoir and open in response to the signal from the associated temperature sensor independent of a signal from the EERS controller 14. In particular embodiments, the control valves 62, 64, 66, 68 may be controlled by the EERS controller 14 and independent of the EERS controller 14. The EERS controller 14 and/or the control valves 62, 64, 66, 68 may open multiple control valves 62, 64, 66, 68 simultaneously such that exhaust gas flows through multiple gas supply paths 52, 54, 56, 58 simultaneously. When a respective control valve 62, 64, 66, 68 is open, exhaust gas flows through the respective gas supply path 52, 54, 56, 58 and heat exchanger 72, 74, 76, 78 such that the exhaust gas transfers a heat into a media of the respective heat exchanger 72, 74, 76, 78 such that a temperature of the media is increased or heated. Heating the media with the heat exchanger 72, 74, 76, 78 may preheat the media before use in the mobile power system 100. For example, the heat exchanger 72 may heat a lubrication of the power unit 140 such that the lubrication is preheated before being provided to the power unit 140. In some embodiments, the lubrication is preheated to an operating temperature before being provided to the power unit 140. In addition, the heat exchanger 74 may heat a lubrication of the gearbox such that the lubrication is preheated before being provided to the gearbox. Preheating lubrication may increase a life of the component lubricated by the lubricant and/or extend the life of the lubricant. Increasing the life of a component or the lubricant may increase an in service time of the mobile power system 10 and/or reduce costs associated with operating the mobile power system 10.

From the heat exchangers 72, 74, 76, 78, the exhaust gas flows through the respective gas return path 92, 94, 96, 98 and into the gas return line 19. The gas return line 19 terminates in the outlet duct 90 that releases the exhaust gas from the EERS 10 back into the exhaust duct 129 downstream of the inlet duct 20.

One or more of the control valves 62, 64, 66, 68, the EERS controller 14 and/or the control valves 62, 64, 66, 68 may monitor a temperature of the components and/or reservoirs receiving exhaust gas. When a temperature of one of the components and/or reservoirs reaches a respective maximum temperature, the EERS controller 14 sends a signal to the respective control valve 62, 64, 66, 68 to close (Step 240). In some embodiments, the respective control valves 62, 64, 66, 68 receives a signal from a temperature sensor indicative of the maximum temperature and closes in response to the signal. The maximum temperature may be a desired operating temperature of the components and/or liquids within the reservoirs.

When the inlet duct 20 is open, the EERS controller 14 and/or the pressure relief valve 40 receives signals indicative of the pressure within the gas supply line 12 (Step 250). For example, the EERS controller 14 may receive signals from the pressure sensor 26 and/or pressure sensor 28 to measure a pressure within the gas supply line 12. In some embodiments, the pressure relief valve 40 may receive signals from the pressure sensors 26, 28 indicative of the pressure within the gas supply line 12. When the pressure within the gas supply line 12 exceeds a predetermined maximum pressure, the pressure relief valve 40 opens such that exhaust gas bypasses the manifold 50 and passes to the gas return line 19 (Step 254). In some embodiments, when the pressure relief valve 40 is open, exhaust gas flows through the gas supply line 12 into the manifold 50 and flows through the pressure relief valve 40 to the gas return line 19. When the pressure within the gas supply line 12 drops below a predetermined pressure, the pressure relief valve 40 closes such that the exhaust gas passes from the gas supply line 12 to the manifold 50 (Step 256).

When all of the control valves 62, 64, 66, 68 are closed in response to the temperatures of all of the components and reservoirs being at operating levels such that additional heat from the EERS 10 is not required, the EERS controller 14 may provide a signal to the inlet valve 22 to close the inlet duct 20 (Step 260). When the inlet duct 20 is closed, the exhaust gas within the EERS 10 may be released by cycling the pressure relief valve 40 and/or the control valves 62, 64, 66, 68 to an open position and then the closed position thereof to evacuate any remaining exhaust gas from the EERS 10 (Step 264). When the inlet duct 20, the pressure relief valve 40, and the control valves 62, 64, 66, 68 are in the closed position, the EERS 10 is returned to the initial or shutdown configuration.

Figure 6:
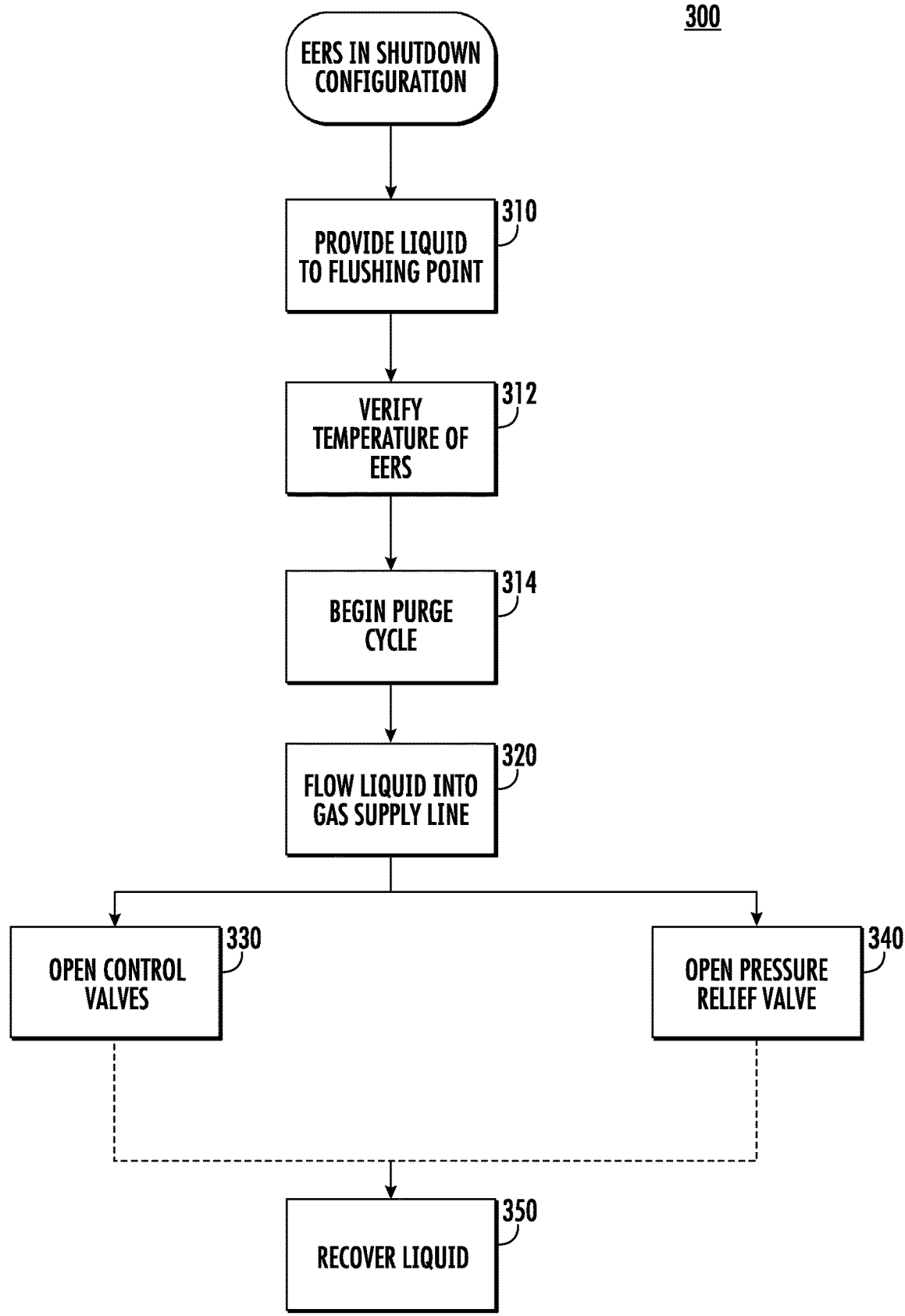
FIG. 6 is a flowchart of a method of purging an exhaust energy recovery system according to an embodiment of the present disclosure.

FIG. 6 illustrates a method of cleaning or purging the EERS 10 in accordance with an embodiment of the disclosure with reference to the EERS 10 of FIG. 3 and is referred to generally as method 300. The method 300 may be performed to remove residue in the form of particulates or other matter from the EERS 10. When the EERS 10 is in the shutdown configuration, a liquid source is connected to the flushing port 82 to provide or inject liquid into the EERS 10 (Step 310). The EERS controller 14 may receive a signal from the flushing port 82 indicative of a liquid source being connected or may receive user input to enter into a purge cycle (Step 314). As the EERS controller 14 begins the purge cycle, the EERS controller 14 may verify that a temperature within the EERS 10 is below a predetermined temperature (Step 312). For example, the EERS controller 14 may verify temperatures at each of the components or reservoirs to verify that the temperature of each is below a predetermined temperature. The predetermined temperature may be in a range of 40° F. and 150° F., for example. The EERS controller 14 may prevent liquid from entering the EERS 10 until the EERS 10 is below a predetermined temperature.

When the EERS 10 is below a predetermined temperature, liquid flowing through the flushing port 82 enters the gas supply line 12 (Step 320). With liquid within the gas supply line 12, the EERS controller 14 opens the control valves 62, 64, 66, 68 to flow fluid through each of the heat exchangers 72, 74, 76, 78 (Step 330). The EERS controller 14 may open the control valves 62, 64, 66, 68 simultaneously or may sequentially open and close the control valves 62, 64, 66, 68. In some embodiments, the EERS controller 14 may pulse one or more of the control valves 62, 64, 66, 68 to purge the gas supply paths 52, 54, 56, 58, the control valves 62, 64, 66, 68, and heat exchanges 72, 74, 76, 78. The EERS controller 14 also opens the pressure relief valve 40 to purge the pressure relief valve 40 (Step 340). The EERS controller 14 may pulse the pressure relief valve 40 between the open and closed positions. The pulsing of the control valves 62, 64, 66, 68 and/or the pressure valve 40 may increase an efficacy of the fluid purging the EERS 10. The EERS controller 14 may open the control valves 62, 64, 66, 68 simultaneously or sequentially with the pressure relief valve 40.

The fluid that enters the EERS 10 through the flushing port 82 flows through the EERS 10 and exits the gas return line 19 through the outlet duct 90 into the exhaust duct 129 of the engine 120. The engine 120 may be operating when the method 300 is run such that the fluid exiting the outlet duct 90 is liquefied by exhaust gas of the engine 120. In some embodiments, the method 300 is performed when the engine 120 is not operating. In such embodiments, the method 300 may include recovering the fluid used to flush the EERS 10 (Step 350).

An embodiment of the flushing port 82 and an embodiment of the method 300 of purging the EERS 10 may be advantageous, for example, when the engine 120 is a dual-fuel turbine or when a fuel of the turbine creates particulates in the exhaust gas. For example, when a gas turbine is run on #2 diesel fuel, the exhaust gas may include particulates that may decrease the efficiency or clog components of the EERS 10. A clog in the EERS 10 may increase backpressure within the EERS 10 and ultimately the exhaust duct 129. As such, purging or cleaning the EERS 10, as detailed with respect to method 300, may increase the efficiency of the EERS 10 and/or reduce downtime of the EERS 10 for maintenance and cleaning as will be understood by those skilled in the art.

The components of the EERS 10 detailed above that are come into contact with the exhaust gases including, but not limited to, lines, paths, valves, manifold, heat exchangers, seals, and ducts, as will be understood by those skilled in the art, are required to be rated to temperatures greater than anticipated temperatures of the exhaust gases, e.g., 900° F. or 1000° F. For example, the lines, paths, valves, manifold, heat exchangers, seals, and ducts may be constructed of stainless steel and may include reinforced walls. For example, 316/314 stainless steel may be used to construct components of the EERS 10. The fittings between the components of the EERS 10 may be double ferrule compression type fittings. Suitable fittings may be available from SwageLok®.

The foregoing description of the disclosure illustrates and describes various exemplary embodiments. Various additions, modifications, changes, etc., could be made to the exemplary embodiments without departing from the spirit and scope of the disclosure. It is intended that all matter contained in the above description or shown in the accompanying drawings shall be interpreted as illustrative and not in a limiting sense. Additionally, the disclosure shows and describes only selected embodiments of the disclosure, but the disclosure is capable of use in various other combinations, modifications, and environments and is capable of changes or modifications within the scope of the inventive concept as expressed herein, commensurate with the above teachings, and/or within the skill or knowledge of the relevant art. Furthermore, certain features and characteristics of each embodiment may be selectively interchanged and applied to other illustrated and non-illustrated embodiments of the disclosure.

What is claimed is:

1. A method of recovering energy from exhaust gas of a gas turbine engine of a mobile power system, the method comprising:
   operating the gas turbine engine mounted to a trailer, the engine having an intake port and an exhaust duct;
   opening an inlet duct in fluid communication with the exhaust duct to divert a portion of exhaust gas flowing from the exhaust duct to an exhaust energy recovery system (EERS) mounted to the trailer such that:
      the exhaust gas flows through a first heat exchanger of the exhaust energy recovery system to transfer heat from the exhaust gas to fluid of a first heat distribution reservoir mounted to the trailer; and
      the exhaust gas returns through the exhaust duct of the engine via an outlet duct of the EERS, the outlet duct being in fluid communication with the exhaust duct downstream of the inlet duct; and
   flushing the exhaust energy recovery system including:
      verifying the inlet duct is closed; and
      injecting a fluid into the exhaust energy recovery system when the inlet duct is closed to purge the exhaust energy recovery system.

2. The method according to claim 1, wherein flushing the exhaust energy recovery system includes
   injecting water into a flushing port such that water flows through the exhaust energy recovery system and into the exhaust duct via the outlet duct to purge the exhaust energy recovery system.

3. The method according to claim 1, further comprising distributing exhaust gas flowing through the exhaust energy recovery system to the first heat exchanger and a second heat exchanger via a manifold disposed in the EERS between the first heat exchanger and the inlet duct.

4. The method according to claim 3, further comprising controlling a flow of exhaust gas from the manifold to the first heat exchanger by operating a control valve disposed between the manifold and the first heat exchanger.

5. The method according to claim 4, wherein controlling the flow of exhaust gas from the manifold to the first heat exchanger includes:
   operating the control valve towards an open position in response to fluid in the first heat distribution reservoir being below a first predetermined temperature; and
   operating the control valve towards a closed position in response to fluid in the first heat distribution reservoir being at or above a second predetermined temperature.

6. The method according to claim 1, further comprising controlling the inlet duct by opening and closing the inlet duct in response to a temperature of fluid of the first heat distribution reservoir.

7. The method according to claim 1, further comprising opening a pressure relief valve of the EERS in response to a pressure of exhaust gas within the exhaust energy recovery system being at or above a predetermined pressure such that exhaust gas from the inlet duct bypasses the first heat exchanger and returns to the exhaust duct via the outlet duct.

* * * * *